(12) United States Patent  
Wang et al.

(10) Patent No.: US 10,562,642 B2  
(45) Date of Patent: Feb. 18, 2020

(54) PREDICTION OF VEHICLE MANEUVERS BASED ON SIGNAL CHARACTERISTICS

(71) Applicant: Honeywell International Inc., Morris Plains, NJ (US)

(72) Inventors: Guoqing Wang, Beijing (CN); Ruy C. Brandao, Redmond, WA (US); Rong Zhang, Beijing (CN); Zhong Chen, Beijing (CN); Ray Zhang, Beijing (CN)

(73) Assignee: Honeywell International Inc., Morris Plains, NJ (US)

( * ) Notice: Subject to any disclaimer, the term of this patent is extended or adjusted under 35 U.S.C. 154(b) by 423 days.

(21) Appl. No.: 15/381,926

(22) Filed: Dec. 16, 2016

(65) Prior Publication Data

US 2018/0170573 A1 Jun. 21, 2018

(51) Int. Cl.
  *B64D 45/00* (2006.01)
  *G01D 7/08* (2006.01)
  *G01S 5/02* (2010.01)
  *G08G 5/04* (2006.01)
  *G01S 19/03* (2010.01)

(52) U.S. Cl.
  CPC ............ *B64D 45/00* (2013.01); *G01D 7/08* (2013.01); *G01S 5/0252* (2013.01); *G01S 5/0284* (2013.01); *G01S 5/0294* (2013.01); *G08G 5/04* (2013.01); *G01S 19/03* (2013.01)

(58) Field of Classification Search
  None
  See application file for complete search history.

(56) References Cited

U.S. PATENT DOCUMENTS

| 5,280,285 | A | | 1/1994 | Curtis et al. | |
|---|---|---|---|---|---|
| 5,325,302 | A | * | 6/1994 | Izidon | F41G 7/006 342/176 |
| 5,636,123 | A | * | 6/1997 | Rich | G01S 5/0072 342/29 |
| 6,222,480 | B1 | * | 4/2001 | Kuntman | G01S 13/767 342/30 |

(Continued)

FOREIGN PATENT DOCUMENTS

WO 2016070349 A1 12/2016

OTHER PUBLICATIONS

U.S. Appl. No. 14/886,982, by Honeywell International Inc. (Inventors: Guoqing Wang et al.), filed Oct. 19, 2015.

(Continued)

*Primary Examiner* — Christian Chace
*Assistant Examiner* — Edward Torchinsky
(74) *Attorney, Agent, or Firm* — Shumaker & Sieffert, P.A.

(57) ABSTRACT

A system for tracking a vehicle includes a transceiver configured to receive a first signal including first surveillance data from the vehicle at a first time, and receive a second signal from the vehicle at a second time. The system further includes processing circuitry configured to determine a first location and a first course of the vehicle at the first time based on the first surveillance data, and determine a change in power level from the first signal to the second signal. The processing circuitry is further configured to predict a maneuver for the vehicle based on the first location, the first course, and the change in power level from the first signal to the second signal.

20 Claims, 17 Drawing Sheets

(56) References Cited

U.S. PATENT DOCUMENTS

| | | | |
|---|---|---|---|
| 6,313,783 B1* | 11/2001 | Kuntman | G01S 13/76 342/29 |
| 7,116,266 B1 | 10/2006 | Vesel et al. | |
| 8,269,684 B2* | 9/2012 | Robin | G01S 13/785 343/705 |
| 2002/0075171 A1* | 6/2002 | Kuntman | G01C 23/00 340/961 |
| 2011/0057830 A1 | 3/2011 | Sampigethaya et al. | |
| 2012/0041620 A1 | 2/2012 | Stayton et al. | |
| 2015/0247914 A1 | 9/2015 | Rothacher et al. | |

OTHER PUBLICATIONS

U.S. Appl. No. 15/219,235, by Honeywell International Inc. (Inventors: Quoqing Wang et al.), filed Jul. 8, 2016.
Strohmeier et al., "Realities and Challenges of NextGen Air Traffic Management: The Case of ADS-B," IEEE Communications Magazine, May 2014, 8 pp.
Schafer et al., "Bringing up OpenSky: A Large-scale ADS-B Sensor Network for Research," IEEE, Proceedings of the 13th International Symposium on Information Processing in Sensor Networks, Apr. 15-17, 2014, 12 pp.
Extended Search Report from counterpart European Application No. 17205308.4, dated May 15, 2018, 7 pp.
U.S. Appl. No. 15/524,176, by Honeywell International Inc. (Inventors: Ruy C. Brandao et al.), filed May 3, 2017.
Notice of Intent to Grant and Text Intended to Grant from counterpart European Application No. 17205308.4, dated Dec. 19, 2018, 56 pp.

* cited by examiner

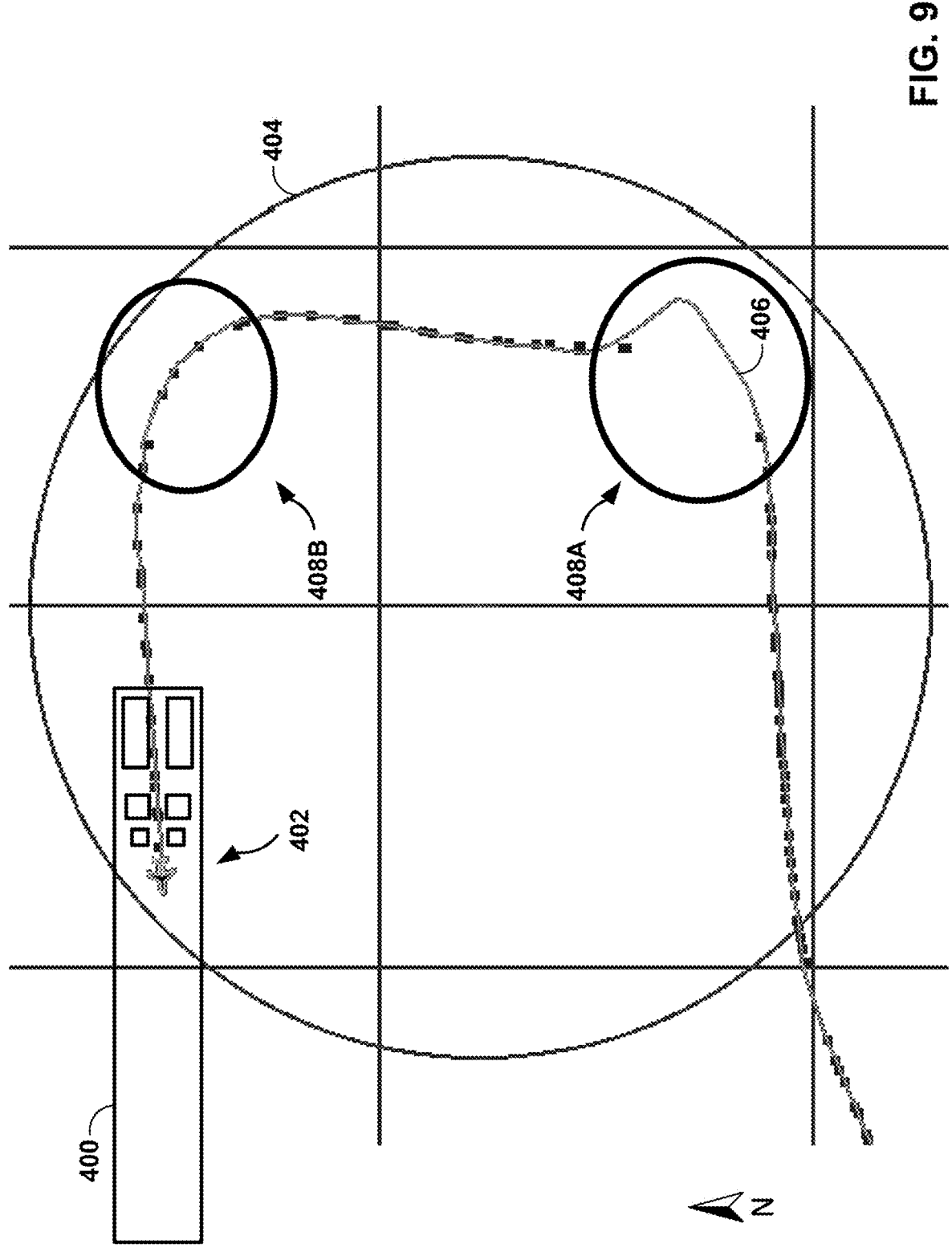

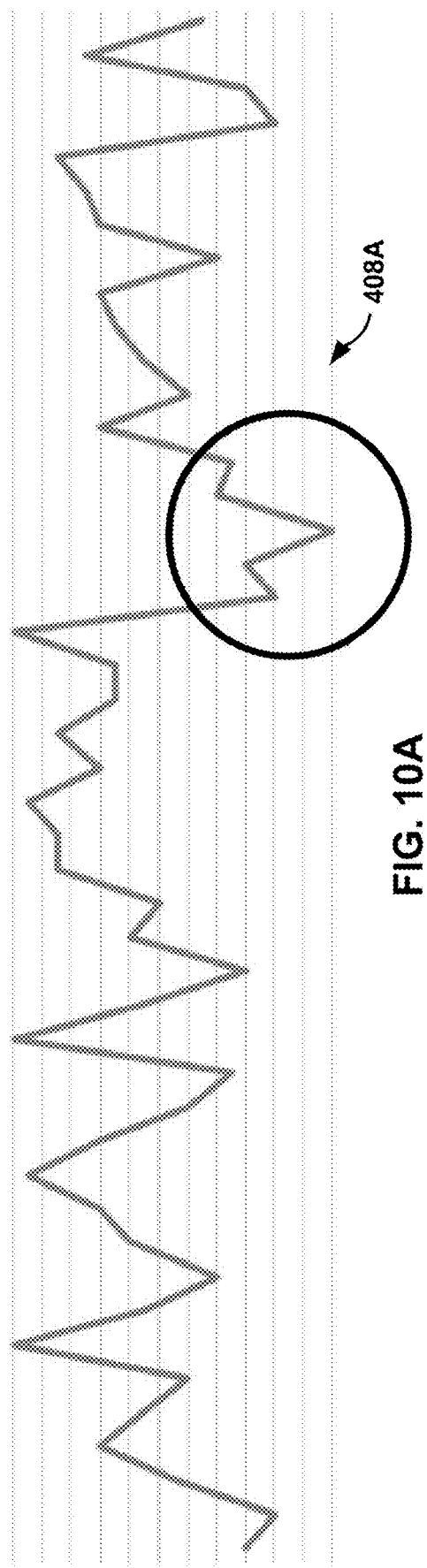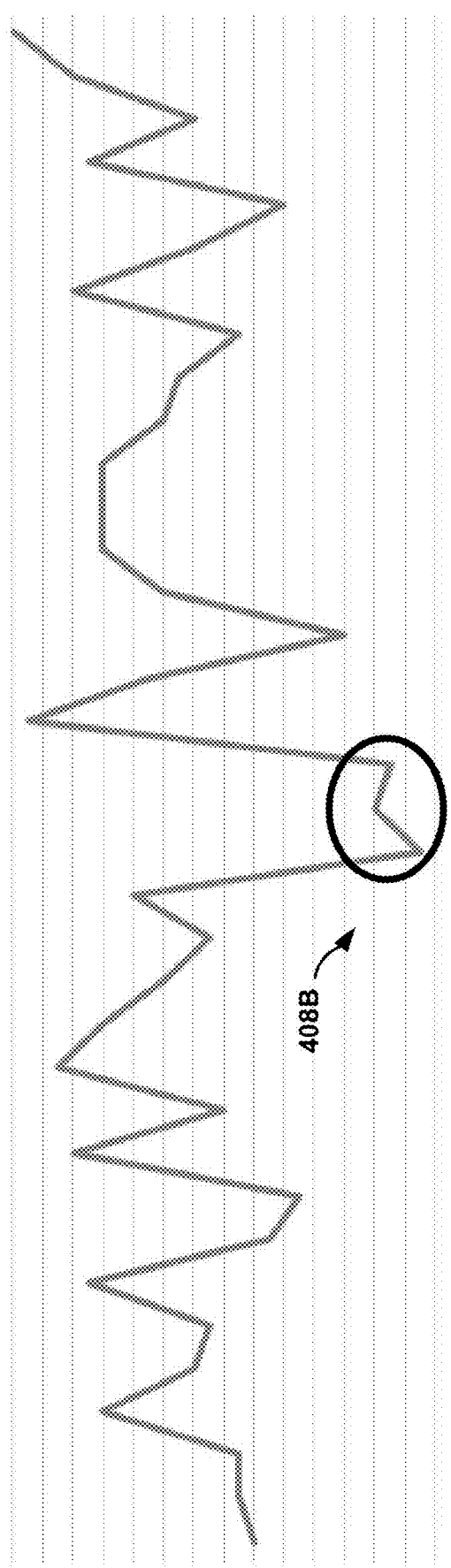
FIG. 10A
FIG. 10B

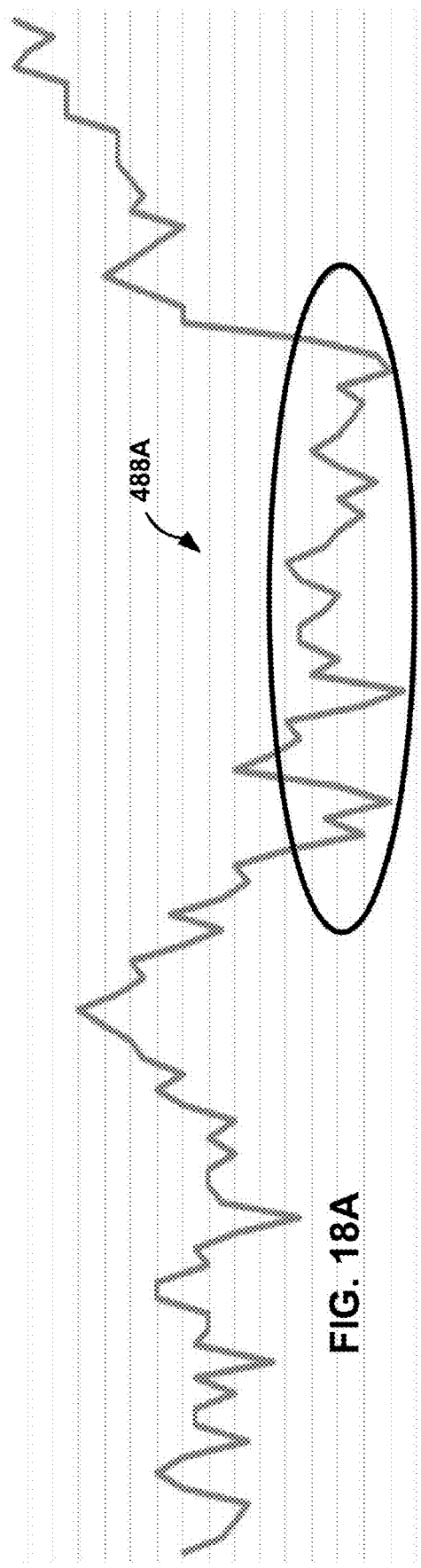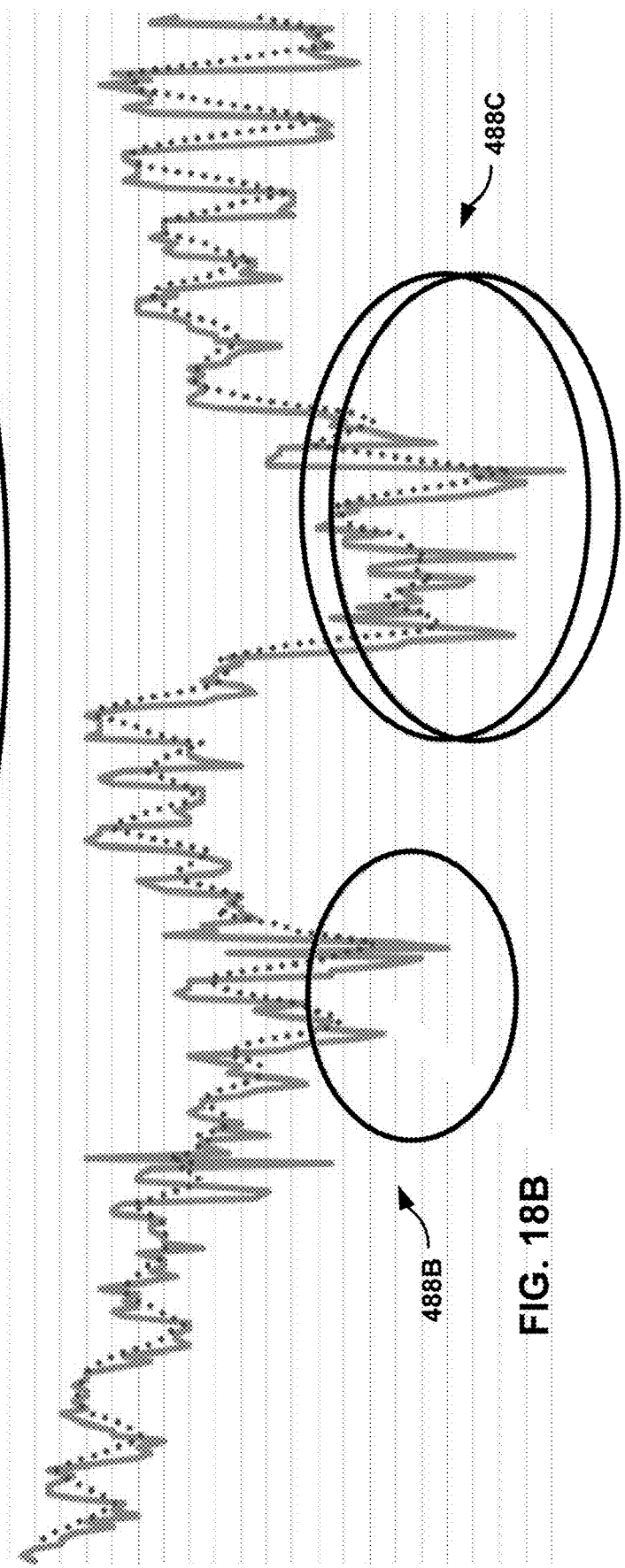
FIG. 18A
FIG. 18B

PREDICTION OF VEHICLE MANEUVERS BASED ON SIGNAL CHARACTERISTICS

TECHNICAL FIELD

This disclosure relates to collision prevention for vehicles.

BACKGROUND

Vehicle traffic control systems, such as air traffic control systems, track positions and velocities of vehicles and help manage the trajectories of the vehicles. Vehicle traffic control may be based on radar surveillance, supplemented more recently with cooperative radio surveillance techniques, such as automatic dependent surveillance-broadcast (ADS-B). A vehicle may determine its own position, such as via a Global Navigation Satellite System (GNSS), and periodically broadcast its position via a radio frequency, which may be read by ground stations and other aircraft. Vehicle position data may be provided to a variety of other applications that serve functions such as traffic situational awareness, traffic alert, and collision avoidance, for example.

A maneuver prediction system may determine the location and course of a target vehicle by receiving and decoding surveillance signals from the target vehicle. The maneuver prediction system may predict a future maneuver for the target vehicle based on the target vehicle's location and course relative to landmarks such as nearby runways. The maneuver prediction system may warn other vehicles based on the predicted maneuver(s) for the target vehicle.

SUMMARY

This disclosure is directed to systems, devices, and methods for generating vehicle traffic alerts. A system of this disclosure may predict a future maneuver for a target vehicle based on the power level of a surveillance signal received from the target vehicle. The power level may indicate that the target vehicle has or has not initiated a maneuver. In some examples, a system implementing the techniques of this disclosure may predict or identify the future maneuver based on a change in power level from a first surveillance signal to a second surveillance signal. The change in power level of signals may indicate the beginning of a maneuver, the ending of a maneuver, and/or a transition within a maneuver.

Existing vehicle traffic control systems receive surveillance data in surveillance signals and determine upcoming maneuvers for target vehicles based on the received surveillance data. In some operating conditions, however, the surveillance signals may have power levels so low that the surveillance data cannot be extracted, in which case the vehicle traffic control systems have no ability to determine a maneuver for the target vehicle. A system implementing the techniques of this disclosure, however, may use the power level of a surveillance signal to predict maneuvers for the target vehicle even if the system cannot extract the surveillance data from the surveillance signal because the power level of the surveillance signal is too low.

In one example, a system for tracking a vehicle includes a transceiver configured to receive a first signal including first surveillance data from the vehicle at a first time, and receive a second signal from the vehicle at a second time. The system further includes processing circuitry configured to determine a first location of the vehicle at the first time based on the first surveillance data, determine a first course of the vehicle at the first time based on the first surveillance data, and determine a change in power level from the first signal to the second signal. The processing circuitry is further configured to predict a maneuver for the vehicle based on the first location, the first course, and the change in power level from the first signal to the second signal.

In another example, a method for tracking a vehicle includes receiving a first signal including first surveillance data from the vehicle at a first time, determining a first location of the vehicle at the first time based on the first surveillance data, and determining a first course of the vehicle at the first time based on the first surveillance data. The method further includes receiving a second signal from the vehicle at a second time, determining a change in power level from the first signal to the second signal, and predicting a maneuver for the vehicle based on the first location, the first course, and the change in power level from the first signal to the second signal.

Another example is directed to a system located on a first vehicle for tracking a second vehicle, wherein the system includes a transceiver configured to receive a first signal including first surveillance data from the second vehicle at a first time, and receive a second signal from the second vehicle at a second time. The system further includes processing circuitry configured to determine if the first vehicle is blocking the second signal and identify, based on determining that the first vehicle is not blocking the second signal, one or more candidate maneuvers for the second vehicle. The processing circuitry is also configured to identify expected signal characteristics for each candidate maneuver of the one or more candidate maneuvers, determine if characteristics of the second signal match the expected signal characteristics for a candidate maneuver of the one or more candidate maneuvers, and predict a location of the second vehicle and a course of the second vehicle based on determining that the characteristics of the second signal match the expected signal characteristics for a candidate maneuver of the one or more candidate maneuvers.

The details of one or more examples are set forth in the accompanying drawings and the description below. Other features, objects, and advantages will be apparent from the description and drawings, and from the claims.

BRIEF DESCRIPTION OF DRAWINGS

FIG. 9 shows a top view diagram of a predicted path and actual locations of a vehicle preparing to land at a runway.

FIGS. 10A-10B are graphs of the power levels of surveillance signals received from the vehicle of FIG. 9.

FIGS. 18A-18B are graphs of the power level of surveillance signals received from the vehicle of FIG. 17, wherein some of the surveillance signals are partially impeded by terrain.

DETAILED DESCRIPTION

Figure 1:
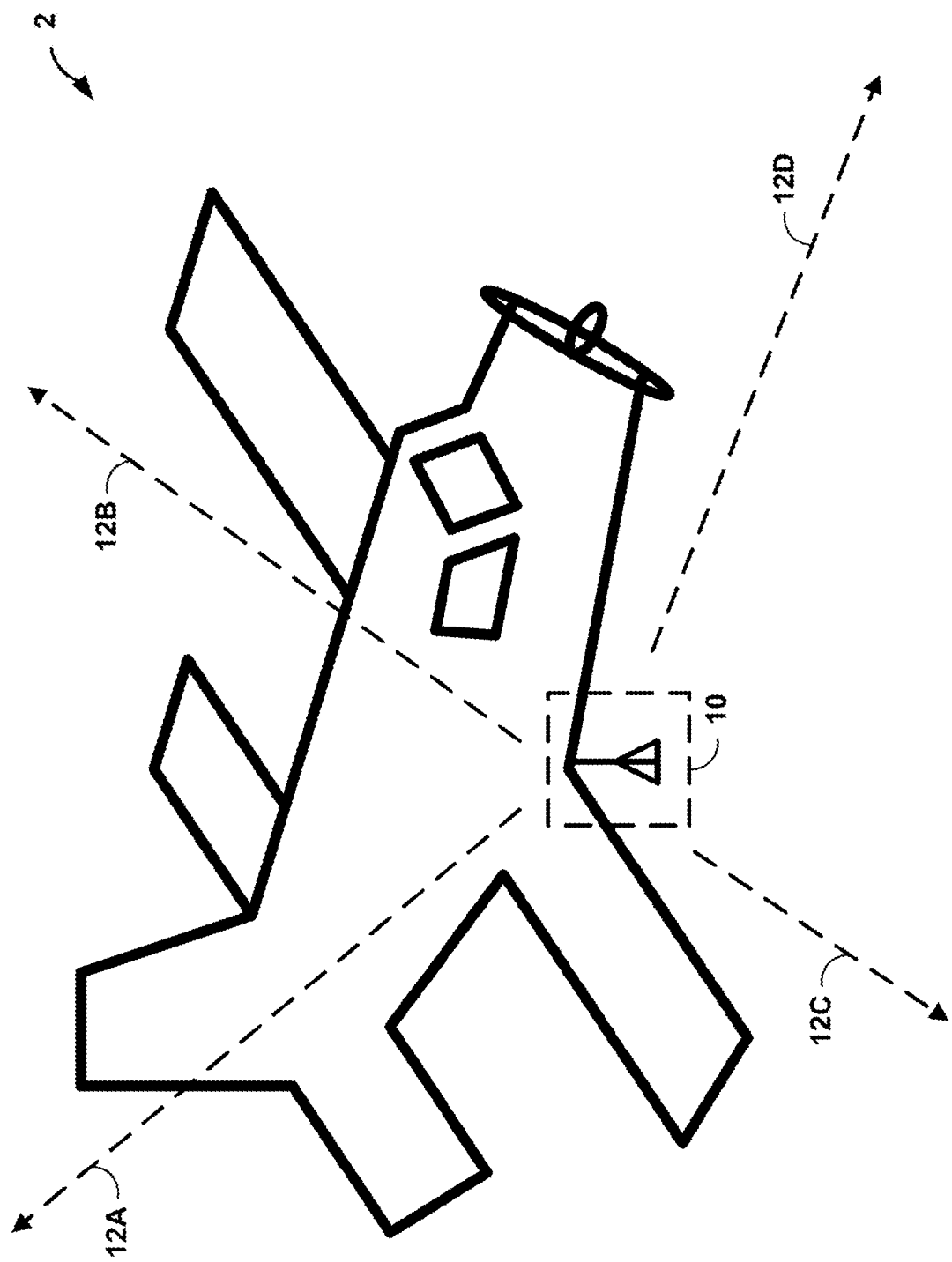
FIG. 1 depicts a transceiver on the bottom of a vehicle, in accordance with some examples of this disclosure.

Various examples are described below generally directed to devices, systems, and methods for maneuver prediction for vehicles. A vehicle may transmit surveillance signals to inform systems and other vehicles of the location and course of the vehicle. When a system including a transceiver receives the surveillance signals from the vehicle, the processing circuitry of the system may determine the location and course of the vehicle. Using the determined location and course of the vehicle, the system may predict a future maneuver for the vehicle.

In some examples, the vehicle or another object may affect the transmission of the surveillance signals from the vehicle to the system. When the transmission of a surveillance signal is impeded, the system may receive a relatively low-power version of the surveillance signal. The system may predict a maneuver based on the relatively low power level of the received surveillance signal by, for example, determining that the vehicle has changed course such that the structure of the vehicle or the other object is impeding the transmission of the surveillance signal. In some examples, the system may receive a relatively high-power version of the surveillance signal. The system may predict a maneuver based on the relatively high power level of the received surveillance signal by, for example, determining that the vehicle has changed course such that the impedance of the structure of the vehicle or the other object has decreased. In some examples, the system may receive a version of the surveillance signal that is neither higher nor lower than previous surveillance signal(s). The system may predict a maneuver based on the power level of the received surveillance signal by, for example, determining that the vehicle has not changed course since the last received surveillance signal. The system may also predict a vehicle maneuver based on a change in power levels between a first surveillance signal and a second surveillance signal.

By predicting the location and the course of the vehicle based on received signal characteristics, the system may respond more quickly to a vehicle maneuver by predicting the vehicle maneuver based on the received signal characteristics. In contrast, another system may not identify the vehicle maneuver until receiving a surveillance signal with an adequate power level. Thus, the techniques of this disclosure may improve the response time for identifying vehicle maneuvers and determining the location and course of the vehicle based on the identified vehicle maneuvers.

As used in this disclosure, the term "predict" generally means to determine a prediction. A system of this disclosure may, for example, determine a prediction by correlating known input data to a prediction using a set of rules, relationships, and/or algorithms. For example, as will be explained in more detail below, to predict a maneuver, a system of this disclosure may determine certain information, such as location, course, and signal power information, and based on that information, determine one or more predicted maneuvers from a group of possible maneuvers. In some instances, the known input data for determining one prediction may include another prediction. As will be explained in more detail below, a predicted maneuver may be used to determine a predicted course or predicted location.

FIG. 1 depicts a transceiver 10 on the bottom of a vehicle 2, in accordance with some examples of this disclosure. FIG. 1 depicts vehicle 2 as an airplane, but vehicle 2 may include any mobile object or remote object that including transceiver 10 for transmitting signals including surveillance data. In other examples, vehicle 2 may include an aircraft such as a helicopter or a weather balloon or a space vehicle such as a satellite or spaceship. In yet other examples, vehicle 2 may include a land vehicle such as an automobile or a water vehicle such as a ship or a submarine. Vehicle 2 may include a manned vehicle or an unmanned vehicle, such as a drone, a remote-control vehicle, or any suitable vehicle without any pilot or crew on board.

Vehicle 2 may include equipment for determining the information included in the surveillance data. For example, vehicle 2 may include satellite navigation equipment such as a Global Positioning System (GPS) or any other suitable means for determining the location of vehicle 2. Vehicle 2 may include processing circuitry for determining the speed, velocity, bearing, and course of vehicle 2 using, for example, satellite navigation, a compass, flight plan data, and/or any other suitable equipment. The processing circuitry in vehicle 2 may determine the course of vehicle 2 using the current trajectory of vehicle 2 along with the flight plan and destination of vehicle 2.

Transceiver 10 is configured to transmit signals including surveillance data. The surveillance data may include data such as the latitude, longitude, and/or altitude of vehicle 2. The surveillance data may also include data such as velocity, course, heading, route, and/or bearing of vehicle 2. In some examples, the signals containing the surveillance data may conform to automatic dependent surveillance-broadcast (ADS-B) surveillance technology.

Transceiver 10 may transmit and receive signals at a specified frequency or within a frequency band. In some examples, the frequency band may include a frequency band of ADS-B or another surveillance protocol, such as one thousand and ninety megahertz or nine hundred and seventy-eight megahertz. Transceiver 10 may include a parabolic reflector antenna, a directional receiver antenna, a slotted waveguide antenna, phased array antenna, or any other suitable antenna. In some examples, transceiver 10 may be configured to transmit and receive squitter signals.

Vehicle 2 may include one or more antennas as a part of transceiver 10. Each of the antennas of transceiver 10 may be positioned at a particular location on vehicle 2. In some examples, vehicle 2 may include a signal antenna of transceiver 10 that may be positioned at or near the bottom of the structure of vehicle 2.

Surveillance signals 12A-12D may represent one or more signals including surveillance data transmitted by transceiver 10 in multiple directions. Transceiver 10 may transmit surveillance signals 12A-12D in all directions or in a limited number of directions. Depending on the number and location of antennas of transceiver 10, the structure of vehicle 2 may impede the transmission of some or all of surveillance signals 12A-12D. For example, if transceiver 10 includes a single antenna on the bottom of vehicle 2, as depicted in FIG. 1, the structure of vehicle 2 may impede the transmission of surveillance signals that travel in an upward direction, such as surveillance signals 12A, 12B.

The structure of vehicle 2 may partially or fully impede the transmission of surveillance signals 12A-12D depending on the position of the antenna(s) of transceiver 10. The impedance of the structure of vehicle 2 may further depend on the transmission direction of surveillance signals 12A-12D. The structure of vehicle 2 may partially or fully impede the transmission of surveillance signals 12A-12D by reducing the power level of one or more of surveillance signals 12A-12D that pass through or around the structure of vehicle 2. In the example of FIG. 1, surveillance signals 12A, 12B, after passing through vehicle 2, may include lower power levels than the power levels of surveillance signals 12C, 12D because the structure of vehicle 2 may not impede surveillance signals 12C, 12D. In some examples, the structure of vehicle 2 may not impede the transmission of a first signal at a first time, but the structure of vehicle 2 may partially or fully impede the transmission of a second signal at a second time.

Transceiver 10 may transmit a surveillance signal including a first portion and a second portion. In some examples, the first portion may include location data, and the second portion may include velocity data. For example, the structure of vehicle 2 may partially impede the transmission of the first portion but not the second portion. In this example, the second portion of the signal may include a higher power level than the power level of the first portion of the signal after the first portion and the second portion have passed through or around the structure of vehicle 2.

Figure 2:
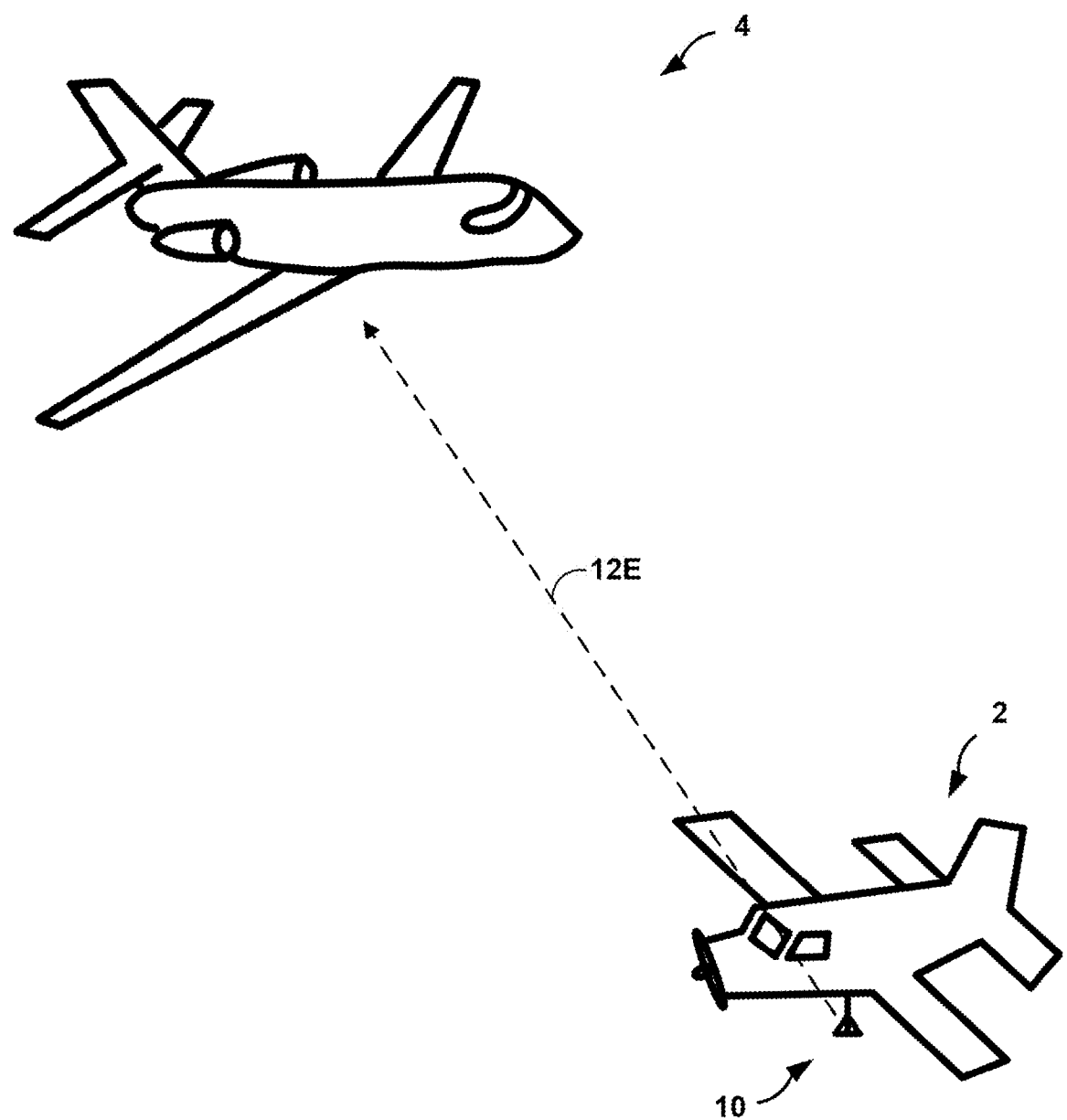
FIG. 2 depicts the vehicle and transceiver of FIG. 1 transmitting a signal to another vehicle, in accordance with some examples of this disclosure.

FIG. 2 depicts the vehicle 2 and transceiver 10 of FIG. 1 transmitting a surveillance signal 12E to another vehicle 4, in accordance with some examples of this disclosure. For purposes of this disclosure, vehicle 2 may be referred to as the "target vehicle," and vehicle 4 may be referred to as the "ownship." Transceiver 10 may include an antenna that is positioned on the bottom of vehicle 2 such that the structure of vehicle 2 partially or fully impedes the transmission of surveillance signal 12E. Surveillance signal 12E may include surveillance data indicating the location and course of vehicle 2.

Vehicle 4 may include a system including a transceiver and processing circuitry. In some examples, the system including the transceiver and processing circuitry of vehicle 4 may be located in a base station or another non-moving object or facility. The system including the transceiver and processing circuitry may be located in a mobile object such as a marine vehicle, a land vehicle, an airborne vehicle, or a space vehicle such as a satellite.

The transceiver of vehicle 4 is configured to receive a first signal including first surveillance data from vehicle 2 at a first time and a second signal from vehicle 2 at a second time. The processing circuitry of vehicle 4 is configured to determine a first location and a first course of vehicle 2 at the first time based on the first surveillance data. The first surveillance data may include information indicating the location and the course of vehicle 2 at the first time. The processing circuitry may be configured to extract the surveillance data from the first signal. The first signal may include a sufficient power level such that the processing circuitry of vehicle 4 is able to extract and process the surveillance data.

The processing circuitry of vehicle 4 may be configured to identify one or more candidate maneuvers for vehicle 2 based on the first location and the first course of vehicle 2. The processing circuitry of vehicle 4 may identify the one or more expected maneuvers of vehicle 2 further based on the location and course of vehicle 2 in relation to a runway, magnetic north, or some other landmark or direction. Example details of predicting vehicle maneuvers and trajectory propagation may be found in U.S. Patent Application entitled "PREDICTION OF VEHICLE MANEUVERS," filed Jul. 25, 2016, having application Ser. No. 15/219,235 and U.S. Patent Application entitled "AIRCRAFT MANEUVER DATA MANAGEMENT SYSTEM," filed Oct. 19, 2015, having application Ser. No. 14/886,982, which are incorporated herein by reference in their entirety.

In accordance with the techniques of this disclosure, the processing circuitry of vehicle 4 may be configured to determine a change in power level between two surveillance signals received from transceiver 10. The processing circuitry may measure the power levels of each surveillance signal, for example in watts or decibels, and determine a difference between the power levels. The processing circuitry may calculate the difference between the power levels by subtraction or, for decibels, an equation. The processing circuitry of vehicle 4 may be further configured to predict a maneuver for vehicle 2 based on the first location and the first course of vehicle 2 and the change in power level of the surveillance signals. In some examples, the processing circuitry of vehicle 4 may be configured to predict a maneuver for vehicle 2 by choosing a maneuver from one or more predicted maneuvers. The processing circuitry may predict a maneuver by determining a predicting maneuver that is most likely to occur in the future or be occurring at the present moment based on the available evidence, such as previous location, previous course, signal characteristics, and any other available information. The processing circuitry of vehicle 4 may be configured to predict and/or choose the maneuver by matching the power level of the second signal and/or the change in power level to an expected power level for the maneuver. The processing circuitry of vehicle 4 may, for example, determine if the power level of the second signal matches the expected power level for the maneuver by determining if the power level for the second signal is within a threshold (e.g., plus or minus five percent, ten percent, twenty percent, etc.) of the expected power level. In other words, the processing circuitry of vehicle 4 may determine if the power level of the second signal matches the expected power level for the maneuver by determining if the power level for the second signal is within a range of power levels associated with the maneuver. In some examples, the processing circuitry may select a candidate maneuver with expected signal characteristics that are closest to the actual signal characteristics of a received surveillance signal.

In some examples, the power level for a second surveillance signal may be lower than the power level of a first surveillance signal if vehicle 2 began turning toward vehicle 4 between the first time and the second time. The power for the second signal may be higher than the power level of the first signal if vehicle 2 began turning away from vehicle 4 between the first time and the second time. The processing circuitry of vehicle 4 may predict the maneuver for vehicle 2 based on the power level of the second signal, along with location and course data for vehicle 2 and any other relevant information available to the processing circuitry of vehicle 4. For purposes of this disclosure, predicting a maneuver "based on" one or more data items may include predicting the maneuver based at least in part on the one or more data items, as well as possibly predicting the maneuver based on other unenumerated data items.

The processing circuitry may improve the accuracy of maneuver prediction for vehicle 4 by predicting maneuvers based on the change in power level of surveillance signals. If the power level of the signal is too low such that the processing circuitry cannot extract the location data and/or the course data from the second signal, the processing circuitry may still be able to predict a maneuver for vehicle 2 based on the change in power level of the signals. In some examples, the processing circuitry of vehicle 4 may lose track of vehicle 2 if the power level of the surveillance signal(s) is too low. By improving the accuracy of the predicted maneuver for vehicle 2, the processing circuitry of vehicle 4 may more accurately warn user(s) of a potential collision.

In some examples, vehicle 2 may be an aircraft including a single antenna for transmitting surveillance data. The single antenna may be positioned on or near the bottom of vehicle 2. If vehicle 2 includes a single antenna for transmitting surveillance signals, the surveillance signals may include one or more bits indicating that vehicle 2 includes a single antenna. The processing circuitry of vehicle 4 may determine that vehicle 2 includes a single antenna based on the received surveillance signals. Vehicle 2 may fly at lower altitudes than vehicle 4. If the altitude of vehicle 4 is higher than the altitude of vehicle 2, surveillance signal 12E may travel upward through the structure of vehicle 2. The structure of vehicle 2, including the fuselage of vehicle 2, may partially or fully impede the transmission of surveillance signals 12E to vehicle 4.

Depending on the maneuver of vehicle 2, the impedance of the structure of vehicle 2 with respect to the surveillance signals may increase or decrease. For example, if vehicle 2 turns away from vehicle 4, vehicle 2 may bank or roll away from vehicle 4. As vehicle 2 banks away from vehicle 4, vehicle 2 may reveal or orient transceiver 10 towards vehicle 4, which may decrease the impedance of the structure of vehicle 2 to the transmission of surveillance signal 12E from vehicle 2 to vehicle 4. In contrast, as vehicle 2 turns towards vehicle 4, vehicle 2 may orient transceiver 10 away from vehicle 4, which may increase the impedance of the structure of vehicle 2 to the transmission of surveillance signal 12E from vehicle 2 to vehicle 4.

When the processing circuitry of vehicle 4 receives no surveillance signals from vehicle 2, i.e., a total loss of updates, the processing circuitry may predict a maneuver based on the previous location and course of vehicle 2. The processing circuitry may also predict a maneuver based on the location and course of vehicle 2 relative to a runway and standard procedures that may be stored in a memory onboard vehicle 4, as well as any other suitable information. These techniques may improve the predictions of location and course of vehicle 2. For all situations other than total loss of updates, the processing circuitry of vehicle 4 may predict a maneuver for vehicle 2 based on the characteristics of a surveillance signal received from vehicle 2. In some examples, the processing circuitry of vehicle 4 may predict a maneuver for vehicle 2 based on the change in power levels of two surveillance signals.

Figure 3:
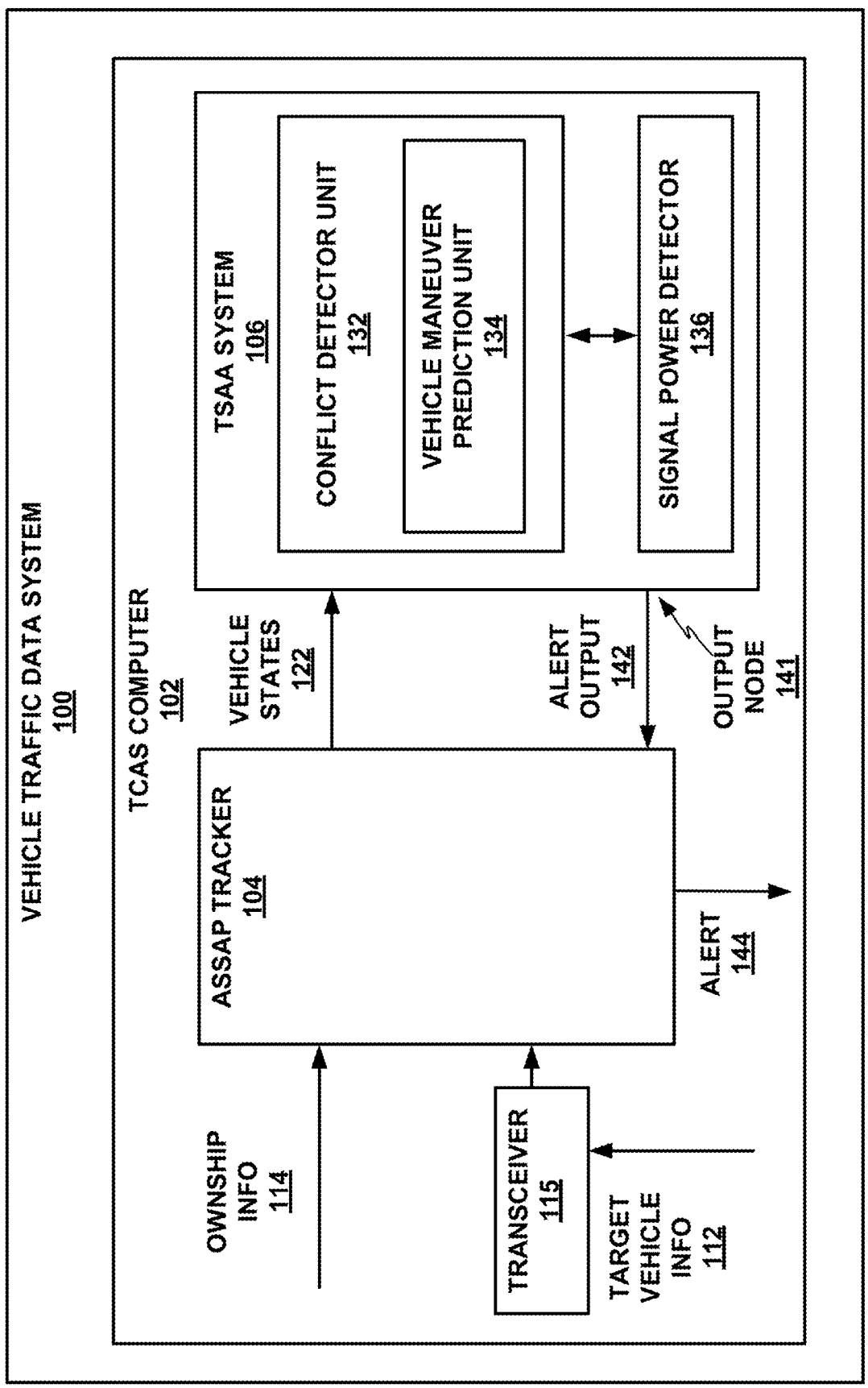
FIG. 3 depicts a conceptual block diagram of an example vehicle traffic data system that includes a Traffic Collision Avoidance System (TCAS) computer.

FIG. 3 depicts a conceptual block diagram of an example vehicle traffic data system 100 that includes a Traffic Collision Avoidance System (TCAS) computer 102. In some examples, vehicle traffic data system 100 may be located on vehicle 4 of FIG. 2. Vehicle traffic data system and TCAS computer 102 may be incorporated as part of the avionics on an aircraft, or may be implemented in a ground station, in various examples. Although described in terms of aircraft, the principles of this disclosure applies to all vehicles, including land vehicles such as automobiles and water vehicles such as ships. TCAS computer 102 includes an Airborne Surveillance and Separation Assurance Processing (ASSAP) tracker 104 and Traffic Situation Awareness and Alert (TSAA) system 106. ASSAP tracker 104 may receive (also referred to herein as collect) surveillance data regarding an ownship and other vehicles. TSAA system 106 includes a conflict detector unit 132 including vehicle maneuver prediction unit 134. Vehicle maneuver prediction unit 134 may predict future vehicle maneuvers based at least in part on surveillance data, signal power levels from signal power detector 136, and a wide variety of vehicle traffic protocols or other sources of vehicle traffic information. Vehicle maneuver prediction unit 134 may also determine a protection volume and an output based at least in part on the predicted future vehicle maneuvers.

As shown in FIG. 3, ASSAP tracker 104 interfaces with and uses TSAA system 106. TSAA system 106 may in some examples be implemented at least in part as a software package or software library comprising computer-executable instructions stored on and/or executed by TCAS computer 102, as well as data stored and/or processed at least in part by TCAS computer 102. TSAA system 106 may also be implemented in hardware or firmware in some examples. Vehicle traffic data system 100 and TCAS computer 102 may also include various other systems and components beyond those shown in FIG. 3 and described below. TCAS computer 102 and/or TSAA system 106 may comprise processing circuitry configured to implement the techniques of this disclosure.

A crew of a vehicle, which may include vehicle traffic data system 100 in some examples, may operate the vehicle in accordance with established guidelines, which may be defined by an entity and followed by vehicles operating within certain regions. For example, the Radio Technical Commission for Aeronautics (RTCA) is an entity that defines Minimum Operational Performance Standards (MOPS or MPS) for General Aviation (GA) aircraft in the United States, including standard DO-317B, which corresponds in Europe to the ED-194 standard defined by European Organisation for Civil Aviation Equipment (Eurocae)). The DO-317B standard includes functionality specifications for Aircraft Surveillance Applications (ASA). In some examples, ASSAP tracker 104 using TSAA system 106 of FIG. 3 may fulfill the ASA functionality specifications of the DO-317B standard, and may also provide additional performance advantages that go beyond the Minimum Performance Standards defined by DO-317B. In other examples, ASSAP tracker 104 may fulfill other functionality specifications of other standards, such as the ED-194 standard or other standards for other regions.

ASSAP tracker 104 may determine, based at least in part on incoming target vehicle information 112, an estimated target vehicle state for each of one or more target vehicle within a selected range or vicinity, where the target vehicle state may include position, altitude, and velocity (both speed and vector of velocity). In some examples, ASSAP tracker 104 may determine and maintain a determined trajectory or track for each of the one or more target vehicle for as long as they remain active targets for tracking, e.g., they remain airborne and within a selected range or within a selected range of an airport proximate the vehicle (the "ownship") that includes vehicle traffic data system 100 or with which system 100 is associated if system 100 is not located onboard a vehicle. ASSAP tracker 104 may also maintain extrapolated, predicted future trajectories or tracks for the ownship and all applicable target vehicle out to a selected common point in time in the future, and update those predicted tracks at a selected frequency, e.g., one hertz.

As noted above for vehicle traffic data system 100 and TCAS computer 102, ASSAP tracker 104 and TSAA system 106 may be implemented on a vehicle or at a ground station. ASSAP tracker 104 may receive or collect, via transceiver 115 in vehicle traffic data system 100 or another transceiver, target vehicle information 112 from one or more surrounding vehicle, which may be referred to as target vehicle, as inputs via an automatic dependent surveillance-broadcast (ADS-B) In Receiver and/or other surveillance data sources. Transceiver 115 is configured to receive information from one or more vehicles or other entities, and may include a network interface card (e.g., an Ethernet card), wireless Ethernet network radios (e.g., WiFi), cellular data radios, as well as universal serial bus (USB) controllers, optical transceivers, radio transceivers, or the like. Target vehicle information 112 may include air-to-air ADS-B reports, automatic dependent surveillance-rebroadcast (ADS-R), traffic information service—broadcast (TIS-B), active TCAS surveillance, and/or other sources of information on other vehicles. ASSAP tracker 104 may also receive ownship information 114 (information on the subject vehicle that hosts vehicle traffic data system 100, if ASSAP tracker 104 is implemented on a vehicle as opposed to a ground station), as inputs. Ownship information 114 may originate from ADS-B reports or TCAS surveillance data that is available to vehicle traffic data system 100. ASSAP tracker 104, or TSAA system 106, may use ownship information 114 to determine a location and a course of the ownship. ASSAP tracker 104 may also use data from other sources, such as a compass or sensors on the ownship, to determine the location and the course of the ownship.

The example of FIG. 3 is further discussed in context of an ASSAP tracker 104 and TSAA system 106 implemented on a subject vehicle that incorporates vehicle traffic data system 100 (the ownship) and evaluating information for the ownship as well as one or more target vehicle. ASSAP tracker 104 may process those inputs, and output vehicle states 122, including target vehicle states and ownship vehicle states, specifying location or position, course or trajectory, and altitude information for the one or more target vehicle and the ownship, to TSAA system 106.

TSAA system 106 receives vehicle states 122 from ASSAP tracker 104 as inputs. TSAA system 106 includes conflict detector unit 132 and signal power detector 136. Conflict detector unit 132 includes vehicle maneuver prediction unit 134. Conflict detector unit 132 may interact with signal power detector 136 and use vehicle maneuver prediction unit 134, and potentially additional units or modules, to perform calculations based at least in part on vehicle states 122 and determine whether there is an imminent risk of two vehicles entering each other's protection volume or protected airspace (or coming too close to each other, as further described below). The protection volume may be defined relative to the respective vehicle and may define a volume of space around the vehicle. When conflict detector unit 132 senses an imminent risk of a protection volume violation, TSAA system 106 may generate, via output node 141, one or more alert outputs 142 of TSAA system 106 to ASSAP tracker 104. The alert outputs 142 generated by TSAA system 106 may indicate target vehicle alert states and alert levels for one or more specific target vehicle, in some examples.

ASSAP tracker 104 may then generate and output one or more alerts 144, e.g., to a pilot or flight crew of the ownship, based on the alert outputs 142 that ASSAP tracker 104 receives from TSAA system 106. ASSAP tracker 104 may output alerts 144 to audio and/or video output interfaces of vehicle traffic data system 100, such as a display and a loudspeaker of the vehicle (e.g., a display in Class II systems and a loudspeaker in Class I or II systems), and/or other systems, components, or devices to which vehicle traffic data system 100 may be operably connected. The alerts 144 generated by ASSAP tracker 104 may also include indications of target vehicle alert states and alert levels for one or more specific target vehicle, based on information in the alert outputs 142 from TSAA system 106, in some examples.

Conflict detection unit 132 may propagate trajectories of the ownship and target vehicle to establish baseline protection volumes based on location, course, speed, and altitude of each vehicle. Vehicle maneuver prediction unit 134 may predict future maneuvers based on the location and course of a vehicle, as well as other data available to TSAA system 106. Vehicle maneuver prediction unit 134 may base the prediction of maneuvers for a target vehicle on the power levels determined by signal power detector 136 for surveillance signals received by vehicle traffic data system 100 from a target vehicle.

Vehicle maneuver prediction unit 134 may also predict the future vehicle maneuver based at least in part on power-level data from signal power detector 136. Signal power detector 136 may measure the power of level of a first surveillance signal and the power level of a second surveillance signal. Signal power detector 136 may also determine a change in power level from the first surveillance signal to the second surveillance signal. For example, signal power detector 136 may determine that the power level of the second surveillance signal is greater than the power level of the first surveillance signal and communicate this determination to conflict detector unit 132. Signal power detector 13 may measure the power level of a signal in Watts, decibels, or in any other suitable measurement scale or method. Vehicle maneuver prediction unit 134 may correlate vehicle turns with airport traffic patterns based on the Radio Technical Commission for Aeronautics (RTCA) specification DO-317B algorithm to avoid wrap-around issues. The standard procedures may also include speeds and accelerations for landing and takeoff, as well as standard altitudes for cruising, flare maneuvers, and takeoff roll. Signal power detector 136 may make this data available to vehicle maneuver prediction unit 134. Vehicle maneuver prediction unit 134 may apply a filter involving velocity trending information to propagate trajectory and improve conflict detection.

ASSAP tracker 104 may generate an output, such as alert 144, based on the modified protection volume. Alert 144 may be based on the presence of a target vehicle in the modified protection volume determined by conflict detector unit 132. The output may also be a graphical user interface feature that displays the modified protection volume to a pilot, a driver, a flight crew member, a ground crew member, an air traffic controller, or another user. By using the change in power levels of signals to predict maneuvers, TSAA system 106 may generate more accurate and timely alerts to warn users of potential collisions.

ASSAP tracker 104 may also generate an output to a display device that depicts the predicted maneuver or the predicted location and course of the target vehicle. The display device may also generate a visual indication of the distance from the ownship to the target vehicle. In some examples, ASSAP tracker 104 may cause a communication element including an antenna to transmit the predicted maneuver or the predicted location and course of the target vehicle to another vehicle or a base station.

Figure 4:
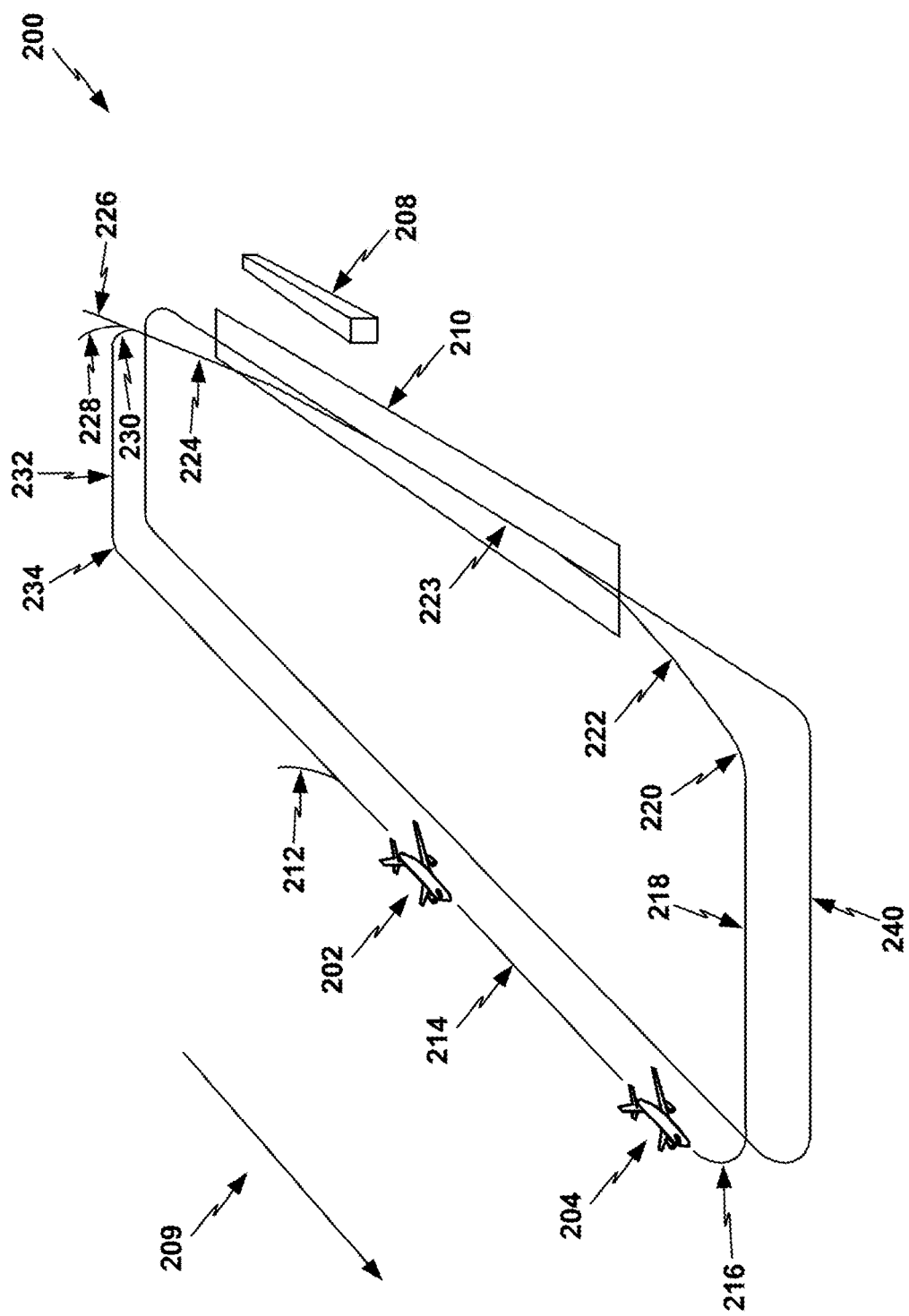
FIG. 4 shows a conceptual perspective diagram of a traffic pattern for a runway, in accordance with some examples of this disclosure.

FIG. 4 shows a conceptual perspective diagram of an airfield traffic pattern for a runway 210, in accordance with some examples of this disclosure. Similar concepts may apply to other traffic patterns and maneuvers for vehicles such as aircraft, land vehicles, marine vehicles, and other vehicles.

Airplane Flying Handbook, FAA-H-8083-3A, chapter seven, includes details on airport traffic patterns. FIG. 4 shows airport airspace 200 around a general aviation (GA) airport with ownship 202 and target aircraft 204, in flight in accordance with a standard procedural flight pattern as may be predicted by TSAA system 106. Wind direction 209 may be parallel to runway 210 with downwind to the left relative to an observer at airport terminal 208, indicating a left-turn air traffic configuration according to procedural air traffic standards (to ensure takeoff into the wind). In cases where the wind direction is opposite to wind direction 209 of this example, procedural flight standards may indicate similar flight patterns but in opposite directions, in a right-turn air traffic configuration. Ownship 202 may enter the procedural pattern at entry turn 212, placing ownship 202 in downwind track 214 behind target aircraft 204. Standard flight procedure may indicate for target aircraft 204 and ownship 202 to follow downwind track 214, base turn 216 into base track 218, and final approach turn 220 to final approach 222 and landing 223, along with steadily reducing speed along this path. In some examples, if an aircraft is not aligned with the centerline of runway 210 during an approach, the aircraft may level out at a traffic pattern altitude for the class associated with the aircraft.

Standard flight procedure for aircraft taking off from runway 210 may include accelerating along track 223 to lift off into departure track 224. Depending on its intended heading, an aircraft in takeoff may continue ascending along a straight line path 226, a shallow turn 228, or a crosswind turn 230 into crosswind track 232, and a subsequent left turn 234 if continuing on a heading opposite to the direction of takeoff. FIG. 4 also shows path 240 as the ground track below and corresponding to the procedural flight tracks 212-234. Aircraft in flight in airspace 200 may be guided by an air traffic control (ATC) tower, or in airports without an ATC tower, the aircraft may fly in accordance with visual acquisition and observation of other aircraft traffic and adherence to standard flight rules and other procedures, such as pursuing the flight tracks 212-234 as described above and maintaining minimum separations from any surrounding target aircraft.

In some circumstances, aircraft 202 and 204 may follow tracks 214, 216, 218, 220, 222, and 223 in order and separated by a standard procedural separation distance along tracks 214-223 throughout the process; while in other circumstances, some deviations from both aircrafts' adherence to this sequence of tracks may occur. In one example without any deviations, aircraft 202 and 204 may begin from the positions as shown in FIG. 4 at a minimum standard procedural separation from each other, when target aircraft 204 begins executing base leg turn 216. Target aircraft 204 may be flying at a lower speed than ownship 202 since target aircraft 204 is further along in the process of decelerating for its landing.

As aircraft 202 and 204 approach base leg turn 216, TSAA system 106 may predict base leg turn 216 as a future aircraft maneuver for aircraft 202 and/or 204. TSAA system 106 may base the prediction of base leg turn 216 on the location and course of aircraft 202 and 204 relative to runway 210. TSAA system 106 may also base the prediction of base leg turn 216 on a set of protocol data indicating standard procedures, such as an airfield traffic pattern, for one or more aircraft maneuvers, such as landing. The protocol data may include the dimensions of runway 210 and the dimensions of path 240. TSAA system 106 may determine a modified protection volume based at least in part on the predicted aircraft maneuver (i.e., base leg turn 216) and generate an output based on the modified protection volume. In some examples, the modified protection volume may be larger than a baseline protection volume in a horizontal dimension to account for the predicted base leg turn 216.

Figure 5:
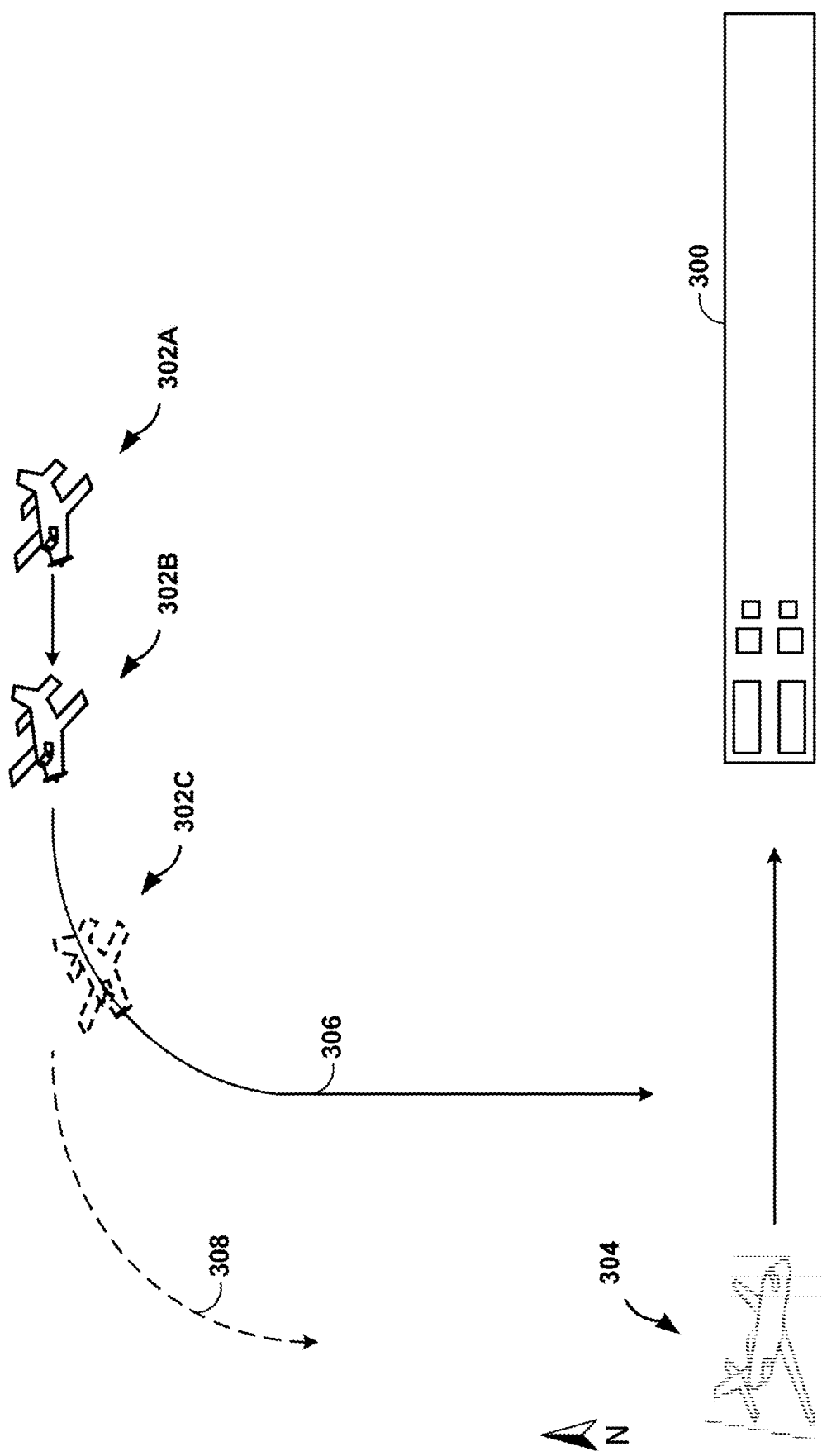
FIG. 5 shows a top view diagram of a predicted path and an actual path of a vehicle, in accordance with some examples of this disclosure.

FIG. 5 shows a top view diagram of a predicted path 308 and an actual path 306 of a vehicle 302, in accordance with some examples of this disclosure. Vehicle 302 may be preparing to land at runway 300 by following a left-turn traffic pattern. Vehicle 302 may transmit surveillance signals to nearby vehicles and facilities, such as vehicle 304, which may be travelling east towards runway 300.

A transceiver onboard vehicle 304 may receive a first signal from vehicle 302 at a first time and a second signal at a second time. Processing circuitry onboard vehicle 304 may determine location 302A and a course of vehicle 302 for the first time and location 302B and a course of vehicle 302 for the second time. Based on locations 302A, 302B and the course of vehicle 302, the processing circuitry may predict that vehicle 302 will turn south at a future time along predicted path 308.

At a third time, vehicle 302 may transmit a third signal including surveillance data indicating location 302C and a course along actual path 306. Actual path 306 may include an earlier turn to the south than predicted path 308. The transceiver of vehicle 302 may receive a low-power version of the third signal, such that the processing circuitry of vehicle 304 may not be able to extract data indicating location 302C and the course of vehicle 302. However, the processing circuitry of vehicle 304 may change the predicted maneuver from predicted path 308 to actual path 306, based on the lower power level of the third signal, based on locations 302A, 302B and the previous course of vehicle 302, and based on the previous location of vehicle 302 relative to runway 300.

The processing circuitry of vehicle 304 may generate one or more candidate maneuvers such as vehicle 302 continuing to travel west and vehicle 302 turning to the south. The processing circuitry may generate these candidate maneuvers based on the location and course of vehicle 304 relative to runway 300. The processing circuitry may determine the location and course of vehicle 304 relative to runway 300 by first determining the location of runway 300, which may be stored in memory or received from a traffic control facility. The processing circuitry may compare locations 302A, 302B to the location of runway 300 to determine the location and course of vehicle 304 relative to runway 300.

The processing circuitry may identify expected signal characteristics for each of the candidate maneuvers. The processing circuitry may predict that, if vehicle 302 continues to travel west, the power level for the third signal may remain unchanged. The processing circuitry may predict that, if vehicle 302 turns to the south, the power level for the third signal may decrease. After the transceiver receives the third signal, the processing circuitry may determine if the signal characteristics of the third signal match the expected signal characteristics for any of the candidate maneuvers. The processing circuitry may predict location 302C and a course along actual path 306 based on determining that the expected signal characteristics of the third signal match a candidate maneuver.

The processing circuitry onboard vehicle 304 may also determine whether the structure of vehicle 304 is blocking the third signal based on the location of antenna(s) on vehicle 304 and the location of vehicle 302. If the processing circuitry determines that the structure of vehicle 304 is blocking signals from vehicle 302, the processing circuitry may not base the prediction of maneuvers on the power level of the signals from vehicle 302. The processing circuitry may determine whether the structure of vehicle 304 is blocking signals based on the location of the transceiver onboard vehicle 304, the orientation of vehicle 304, locations 302A, 302B of vehicle 302, and any other relevant factors. The processing circuitry may predict a maneuver for vehicle 302 based on determining that vehicle 304 is not blocking the third signal.

In some examples, vehicle 304 may not receive the third signal from vehicle 302. The processing circuitry of vehicle 304 may determine that vehicle 304 missed the third signal based on a duration of time that has passed since receiving the second signal. The processing circuitry of vehicle 304 may predict a maneuver for vehicle 302 based on determining that the third signal was missed. The processing circuitry of vehicle 304 may determine that the third signal was missed because the structure of vehicle 304 blocked the reception of the third signal. The processing circuitry of vehicle 304 may predict a maneuver for vehicle 302 based on determining that the structure of vehicle 304 blocked the reception of the third signal from vehicle 302.

By predicting actual path 306 based on the power level of the third signal and/or the change in power level from the second signal to the third signal, the system of vehicle 304 may warn the crew of vehicle 304 that vehicle 302 is approaching. Another maneuver prediction system may expect vehicle 302 to continue along predicted path 308 until the system receives a surveillance signal from vehicle 302 with an adequate power level.

Figure 6:
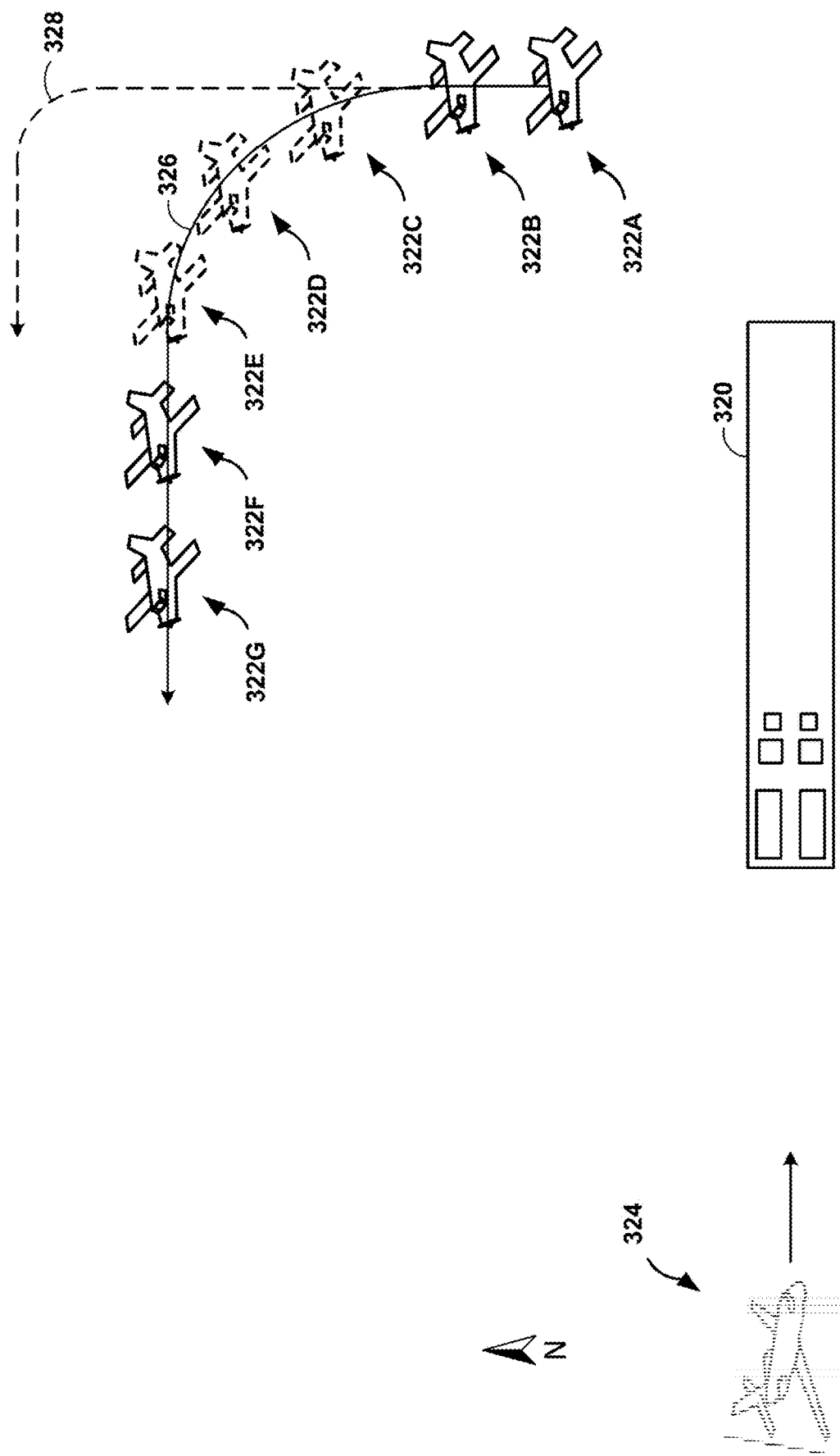
FIG. 6 shows a top view diagram of a predicted path and an actual path of a vehicle, in accordance with some examples of this disclosure.

FIG. 6 shows a top view diagram of a predicted path 328 and an actual path 326 of a vehicle 322, in accordance with some examples of this disclosure. Vehicle 322 may be ascending after takeoff from runway 320 by following a rectangular traffic pattern. Vehicle 322 may transmit surveillance signals to nearby vehicles and facilities, such as vehicle 324, which may be travelling east towards runway 320.

A transceiver onboard vehicle 324 may receive a first signal from vehicle 322 at a first time and a second signal at a second time. Processing circuitry onboard vehicle 324 may determine location 322A and a course of vehicle 322 for the first time and location 322B and a course of vehicle 322 for the second time. Based on locations 322A, 322B and the course of vehicle 322, the processing circuitry may predict that vehicle 322 will continue travelling north along predicted path 328.

At a third time, vehicle 322 may transmit a third signal including surveillance data indicating location 322C and a course along actual path 326. Vehicle 322 may also transmit a fourth signal indicating location 322D and a fifth signal indicating location 322E. Locations 322C-322E may lie along actual path 326, which may include an earlier turn to the west than predicted path 328. The transceiver of vehicle 322 may receive low-power versions of the third signal, the fourth signal, and the fifth signal, such that the processing circuitry of vehicle 324 may not be able to extract data indicating locations 322C-322E and the course of vehicle 322. However, the processing circuitry of vehicle 324 may change the predicted maneuver from predicted path 328 to actual path 326, based on the lower power levels of the third signal, the fourth signal, and the fifth signal, based on locations 322A, 322B and the previous course of vehicle 322, and based on the previous location of vehicle 322 relative to runway 320.

The processing circuitry of vehicle 324 may generate one or more candidate maneuvers such as vehicle 322 continuing to travel north, vehicle 322 turning to the northeast for departure, and vehicle 322 turning to the west. The processing circuitry may identify expected signal characteristics for each candidate maneuver. The processing circuitry may predict that, if vehicle 322 continues to travel north, the power level for the third signal may remain unchanged. The processing circuitry may predict that, if vehicle 322 turns to the northeast for departure, the power level for the third signal may increase. The processing circuitry may predict that, if vehicle 322 turns to the west, the power level for the third signal may decrease. After the transceiver receives the third signal, the processing circuitry may determine if the signal characteristics of the third signal match the expected signal characteristics for any of the candidate maneuvers. The processing circuitry may predict locations 322C-322E and a course along actual path 326 based on determining that the signal characteristics of the third signal match a candidate maneuver, such as a turn to the west. As explained herein, signal characteristics may "match" a candidate maneuver even if the actual signal characteristics are not equal to the expected signal characteristics. The actual signal characteristics may match the expected characteristics if the difference between the actual characteristics and the expected characteristics is less than a threshold value.

By predicting actual path 326 based on the power level of the third signal, the fourth signal, and/or the fifth signal, the system of vehicle 324 may warn the crew of vehicle 324 that vehicle 322 has turned and may be approaching vehicle 324. Another maneuver prediction system may expect vehicle 322 to continue along predicted path 328 until the system receives a surveillance signal from vehicle 322 with an adequate power level.

Figure 7:
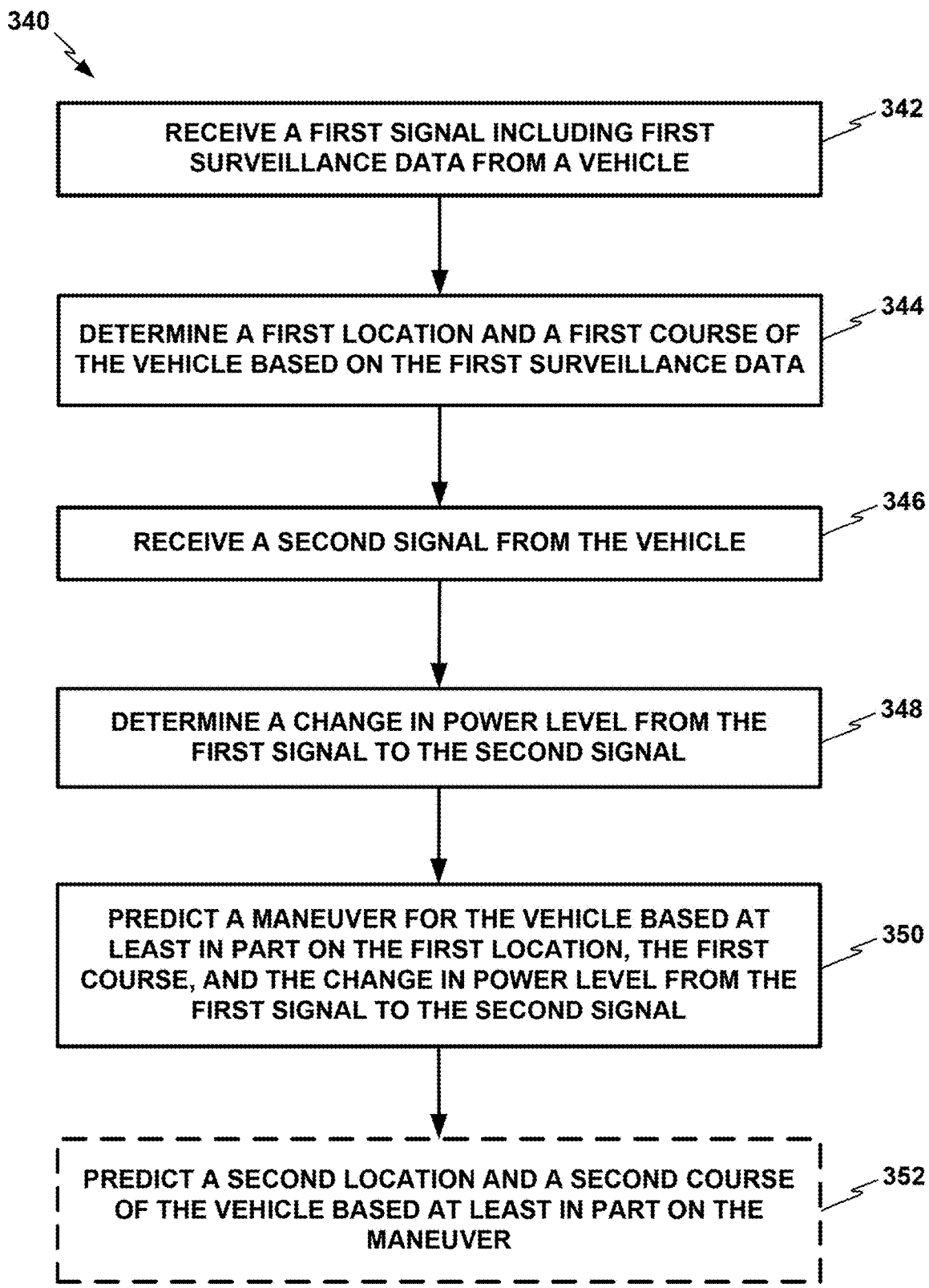
FIG. 7 shows a flowchart for an example technique for predicting a location and course of a vehicle, in accordance with some examples of this disclosure.

FIG. 7 shows a flowchart for an example technique for predicting a location and course of a vehicle, in accordance with some examples of this disclosure. Technique 340 is described with reference to the system of FIG. 2, including vehicles 2 and 4, although other components, such as vehicle traffic data system 100 in FIG. 3, may perform similar techniques.

The technique of FIG. 7 optionally includes receiving a first signal including first surveillance data from vehicle 2 (342). Vehicle 2 may include transceiver 10 with a single antenna located on the bottom of the fuselage of vehicle 2.

Vehicle 4 may include a transceiver for receiving surveillance signals. The first signal may include an adequate power level such that the processing circuitry of vehicle 4 can extract the surveillance data from the first signal.

The technique of FIG. 7 further includes determining a first location and a first course of vehicle 2 at the first time based on the first surveillance data (344). The first surveillance data may include location information such as latitude, longitude, and altitude and course data such as velocity and heading. The processing circuitry of vehicle 4 may extract the surveillance data from the first signal. The processing circuitry of vehicle 4 may store the first location and the first course to a memory onboard vehicle 4. The processing circuitry of vehicle 4 may also predict a future maneuver for vehicle 2 based on the first location and the first course.

The technique of FIG. 7 further includes receiving a second signal from the vehicle (346). Transceiver 10 may transmit the second signal including second surveillance data at a second time that is later than the time of transmission of the first signal. The transceiver of vehicle 4 may receive the second signal through an antenna. The processing circuitry may not be able to extract the surveillance data from the second signal if the power level of the second signal is too low.

The technique of FIG. 7 further includes determining a change in power level from the first signal to the second signal (348). The second signal may generate a current in an antenna of the transceiver of vehicle 4. The processing circuitry of vehicle 4 may include circuitry for measuring the current through the antenna of the transceiver of vehicle 4. The processing circuitry may determine the power level of the second signal based on the current through the antenna.

The technique of FIG. 7 further includes predicting a maneuver for vehicle 2 based on the first location, the first course, and the change in power level from the first signal to the second signal (350). Predicting the maneuver may involve identifying one or more candidate maneuvers, identifying the expected signal characteristics for each candidate maneuver. In some examples, the processing circuitry of vehicle 4 may predict that vehicle 2 is turning away from vehicle 4 if the power level of the second signal is higher than the power level of the first signal. The processing circuitry of vehicle 4 may predict that vehicle 2 is turning towards vehicle 4 if the power level of the second signal is lower than the power level of the first signal.

The technique of FIG. 7 further includes predicting a second location and a second course of vehicle 2 at the second time based on the maneuver (352). The processing circuitry of vehicle 4 may create a trajectory for vehicle 2 and based the second location and the second course on the trajectory. If the power level of the second signal is adequate for the processing circuitry of vehicle 4 to extract the surveillance data from the second signal, the processing circuitry may validate the predicted maneuver with the surveillance data from the second signal.

Figure 8:
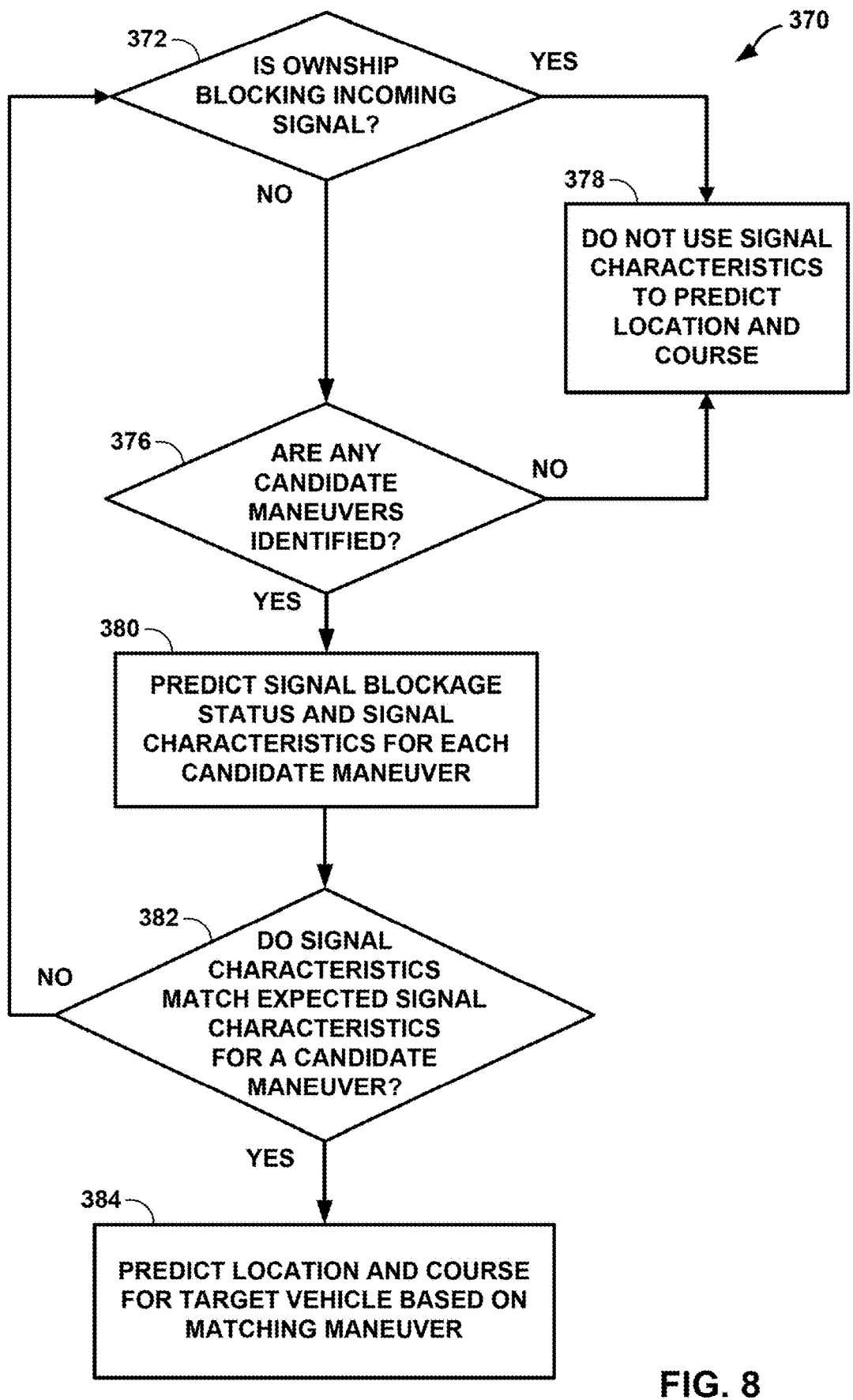
FIG. 8 shows a flowchart for an example technique for predicting a location and course of a vehicle by identifying expected signal characteristics for candidate maneuvers, in accordance with some examples of this disclosure.

FIG. 8 shows a flowchart for an example technique for predicting a location and course of a vehicle by identifying expected signal characteristics for candidate maneuvers, in accordance with some examples of this disclosure. Technique 370 is described with reference to the system of FIG. 2, including vehicles 2 and 4, although other components, such as vehicle traffic data system 100 in FIG. 3, may perform similar techniques.

The technique of FIG. 8 includes determining whether vehicle 4 is blocking incoming signals from transceiver 10 of vehicle 2 (372). The processing circuitry of vehicle 4 may base its determination on the locations of vehicles 2 and 4 and the orientation and geometry of vehicle 4, as well as the location of the antenna(s) onboard vehicle 4. The processing circuitry of vehicle 4 may further base the determination on the current maneuver of vehicle 4 because, for example, rolling and/or banking of vehicle 4 may distort or change the power level of a received signal. If the processing circuitry determines that vehicle 4 is not blocking the incoming signals from transceiver 10 (372, no), the technique of FIG. 8 further includes identifying one or more candidate maneuvers for vehicle 2 (376). In some examples, the identified candidate maneuvers may be based on the location and course of vehicle 2 relative to a nearby runway. The identified candidate maneuvers may also be based on standard protocols for traffic patterns such as landing and takeoff procedures.

If the processing circuitry has not identified any candidate maneuvers (376, no), or the processing circuitry has determined that vehicle 4 is blocking signals from transceiver 10 (372, yes), the processing circuitry may not use the received signal characteristics to predict the location and course of vehicle 2 (378). If the processing circuitry has identified at least one candidate maneuver (376, yes), the technique of FIG. 8 further includes predicting the signal blockage status and identifying expected signal characteristics for each candidate maneuver (380). Depending on the location of the antenna(s) on vehicle 2, the processing circuitry may predict that some candidate maneuvers will increase the impedance to transmitted signals and other candidate maneuvers will decrease the impedance to transmitted signals. The processing circuitry may determine signal characteristics for each candidate maneuver may include absolute power levels and/or changes in power level from a first signal to a second signal.

The technique of FIG. 8 further includes comparing the actual signal characteristics of a received surveillance from vehicle 2 to the expected signal characteristics for a candidate maneuver (382). The actual signal characteristics may include a power level of the received signal. The processing circuitry may determine whether the difference between the actual power level and the predicted power level is less than a threshold power value to determine whether the predicted power level matches the actual power level. If none of the expected signal characteristics match the actual power level (382, no), the technique of FIG. 8 further includes determining whether vehicle 4 is blocking surveillance signals from transceiver 10. If the expected signal characteristics of a candidate maneuver matches the actual power level (382, yes), the technique of FIG. 8 further includes predicting the location and course of vehicle 2 based on the matching maneuver (384).

By generating one or more candidate maneuvers for vehicle 2, the processing circuitry of vehicle 4 may create scenarios for the future behavior of vehicle 2. The processing circuitry may confirm or reject each scenario by matching the actual signal characteristics to the expected signal characteristics.

FIG. 9 shows a top view diagram of a predicted path 406 and actual locations of a vehicle 402 preparing to land at a runway 400. The actual locations of vehicle 402 are represented by the squares located on or near predicted path 406. In some examples, the system receiving surveillance signals from vehicle 402 may be located to the west and at a higher altitude than vehicle 402. Circle 404 may represent a radius of one nautical mile.

FIGS. 10A-10B are graphs of the power levels of surveillance signals received from the vehicle 402 of FIG. 9. During base turn 408A, the power level of surveillance signals received from vehicle 402 may decrease significantly. Another maneuver prediction system may incorrectly predict that vehicle 402 will make a thirty-degree turn to the northeast. During final turn 408B, the power level of surveillance signals received from vehicle 402 may decrease, but not as significantly as during base turn 408B. A system of this disclosure may predict base turn 408A more accurately than predicted path 406 by using the power level of the surveillance signals to predict maneuvers.

Figure 11:
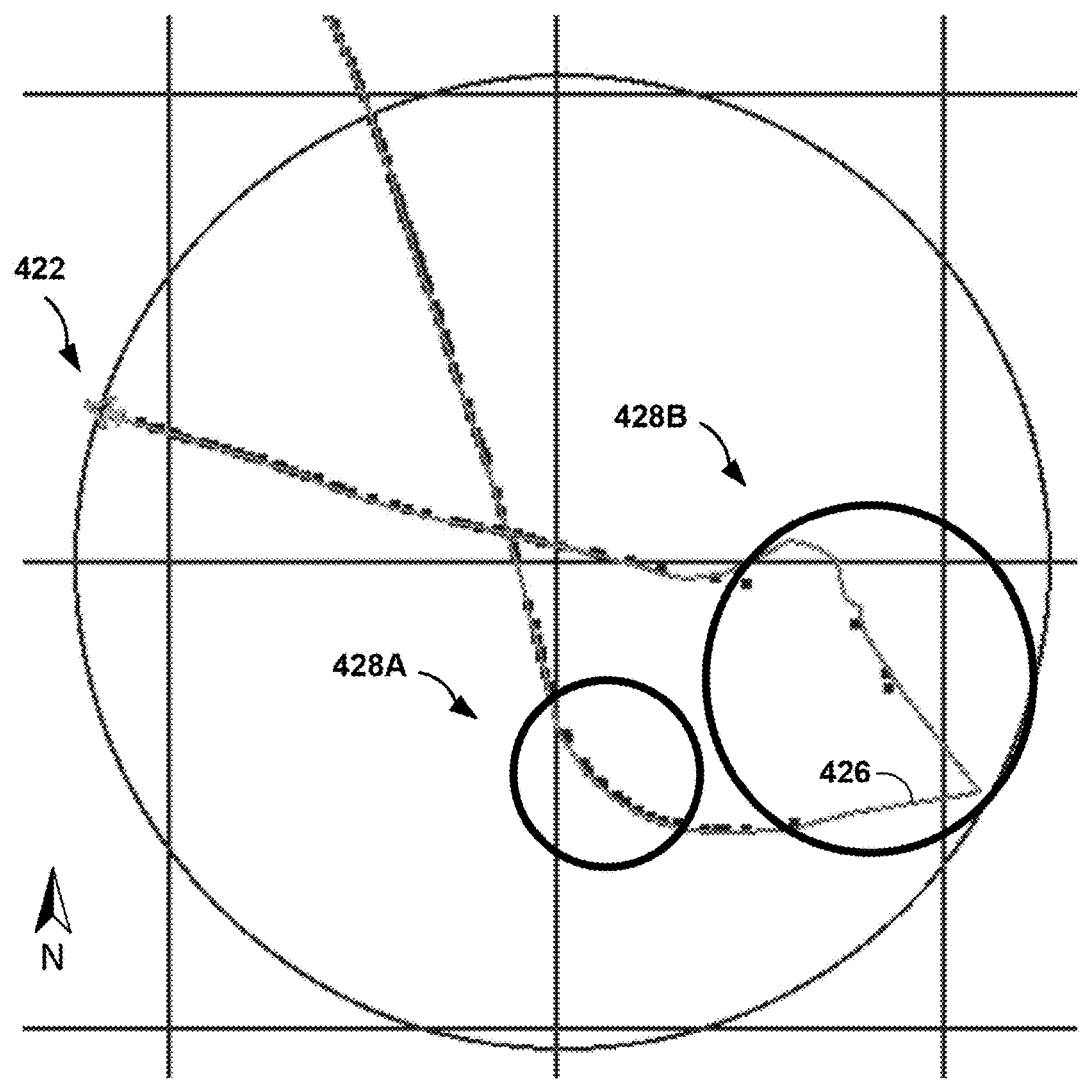
FIG. 11 shows a top view diagram of a predicted path and actual locations of a vehicle conducting training exercises.

FIG. 11 shows a top view diagram of a predicted path and actual locations of a vehicle conducting training exercises. In some examples, the system receiving surveillance signals from vehicle 422 may be located to the west-southwest and at a higher altitude than vehicle 422.

Figure 12:
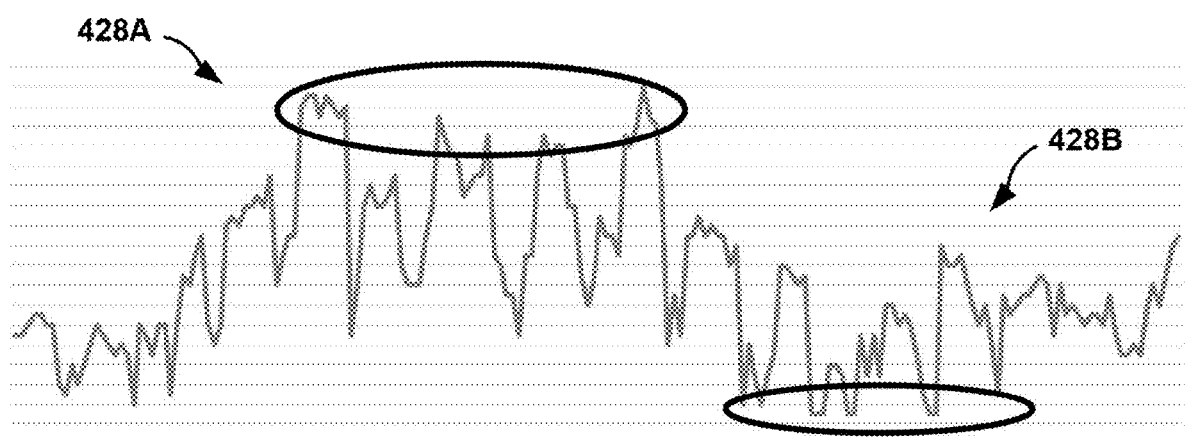
FIG. 12 is a graph of the power level of surveillance signals received from the vehicle of FIG. 11.

FIG. 12 is a graph of the power level of surveillance signals received from the vehicle 422 of FIG. 11. During steep turn 428A, the power level of surveillance signals received from vehicle 422 may increase because vehicle 422 is banking away from the receiving system. The antenna on the bottom of vehicle 422 may be oriented toward the receiving system during steep turn 428A. However, during steep turn 428B, the power level of surveillance signals received from vehicle 422 may decrease because vehicle 422 is banking towards the receiving system. The antenna on the bottom of vehicle 422 may be oriented away from the receiving system during steep turn 428B. Another maneuver prediction system may incorrectly predict that vehicle 402 will travel along its last known course during steep turn 428B. A system of this disclosure may predict steep turn 428B more accurately than predicted path 426 by using the power level of the surveillance signals to predict maneuvers.

Figure 13:
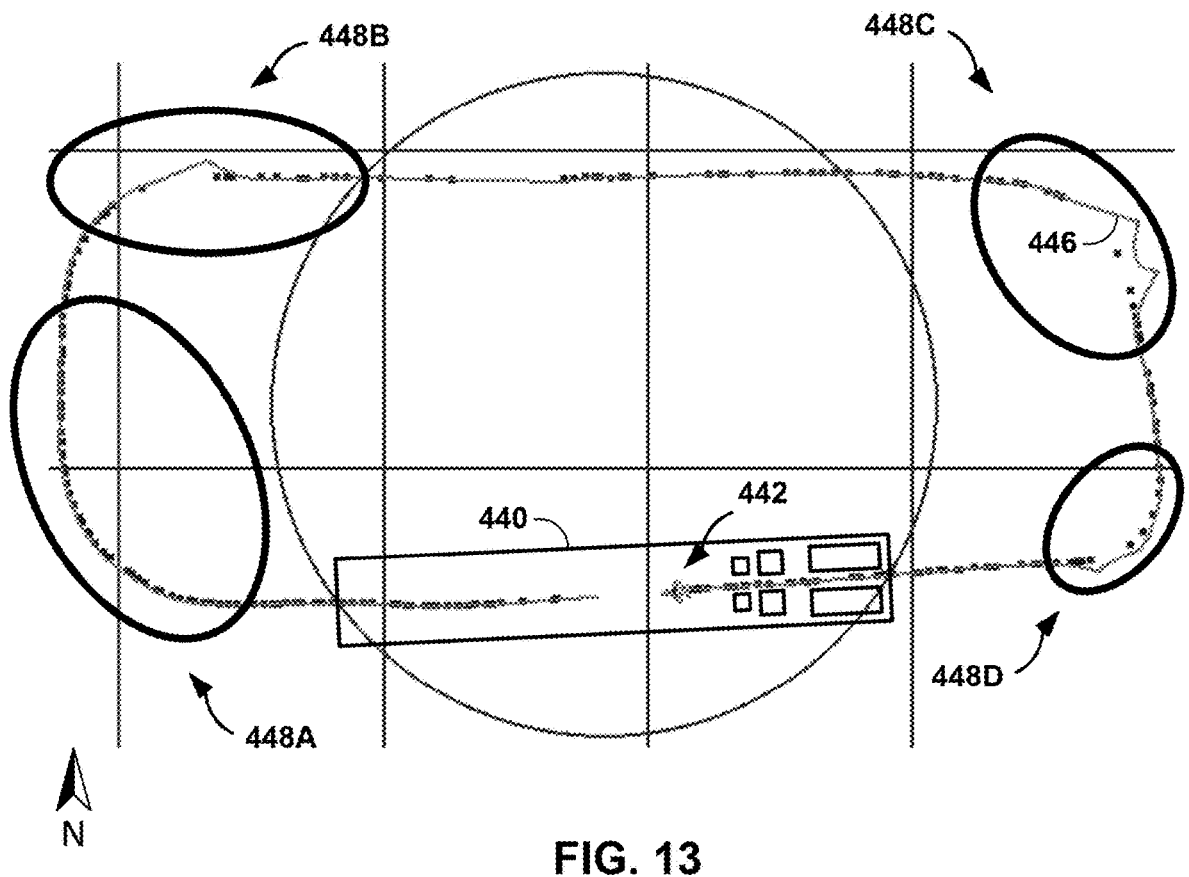
FIG. 13 shows a top view diagram of a predicted path and actual locations of a vehicle preparing to land at a runway.

FIG. 13 shows a top view diagram of a predicted path 446 and actual locations of a vehicle preparing to land at a runway 440. In some examples, the system receiving surveillance signals from vehicle 442 may be located to the west and at a higher altitude than vehicle 442.

Figure 14:
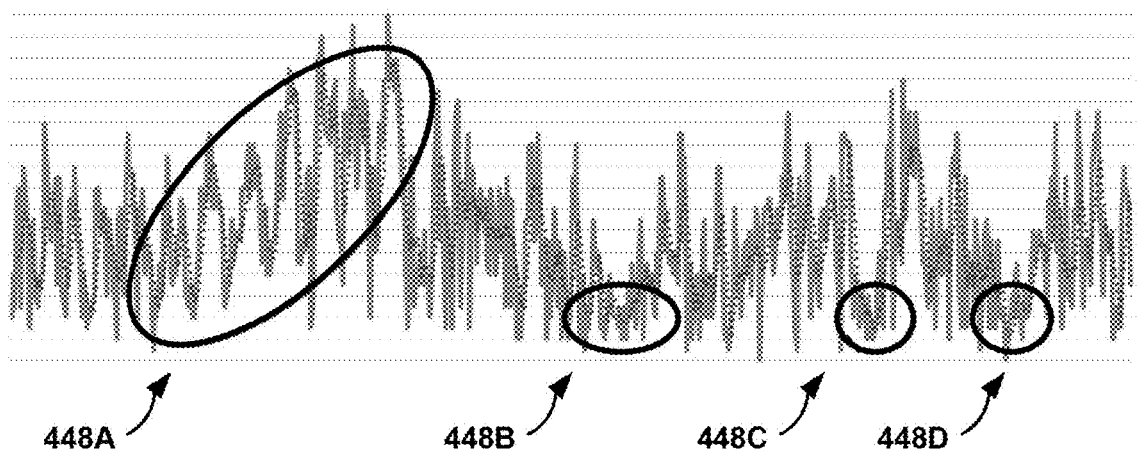
FIG. 14 is a graph of the power level of surveillance signals received from the vehicle of FIG. 13.

FIG. 14 is a graph of the power level of surveillance signals received from the vehicle 442 of FIG. 13. During crosswind turn 448A, the power level of surveillance signals received from vehicle 442 may increase because vehicle 442 is banking away from the receiving system. However, during downwind turn 448B, base turn 448C, and final turn 448D, the power level of surveillance signals received from vehicle 442 may decrease because the antenna on the bottom of vehicle 442 may be oriented away from the receiving system. Another maneuver prediction system may incorrectly predict the course and location of vehicle 442 during downwind turn 448B, base turn 448C, and final turn 448D. A system of this disclosure may predict downwind turn 448B, base turn 448C, and final turn 448D more accurately than predicted path 446 by using the power level of the surveillance signals to predict maneuvers.

Figure 15:
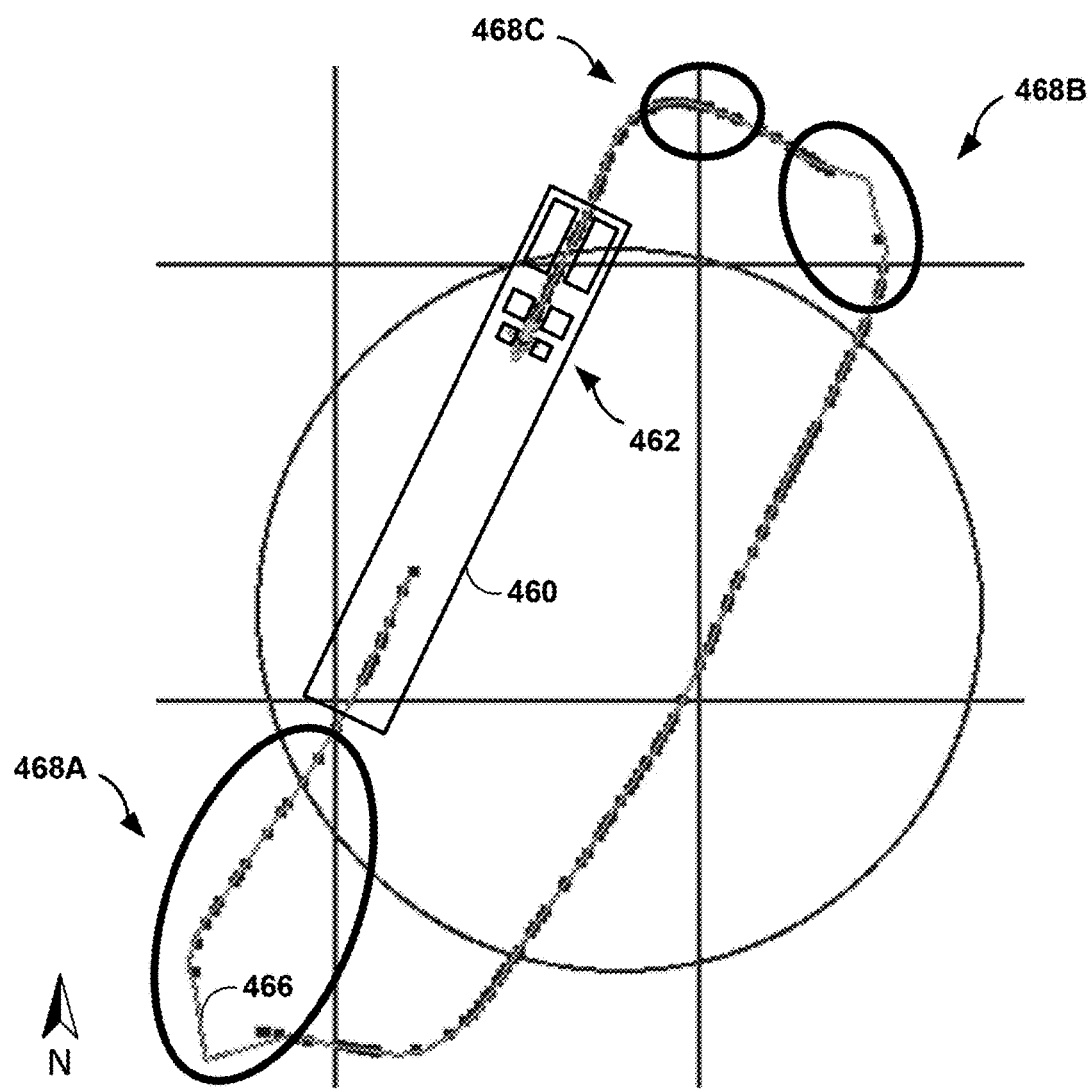
FIG. 15 shows a top view diagram of a predicted path and actual locations of a vehicle preparing to land at a runway.

FIG. 15 shows a top view diagram of a predicted path 466 and actual locations of a vehicle 462 preparing to land at a runway 460. In some examples, the system receiving surveillance signals from vehicle 462 may be located to the northwest and at a higher altitude than vehicle 462.

Figure 16:
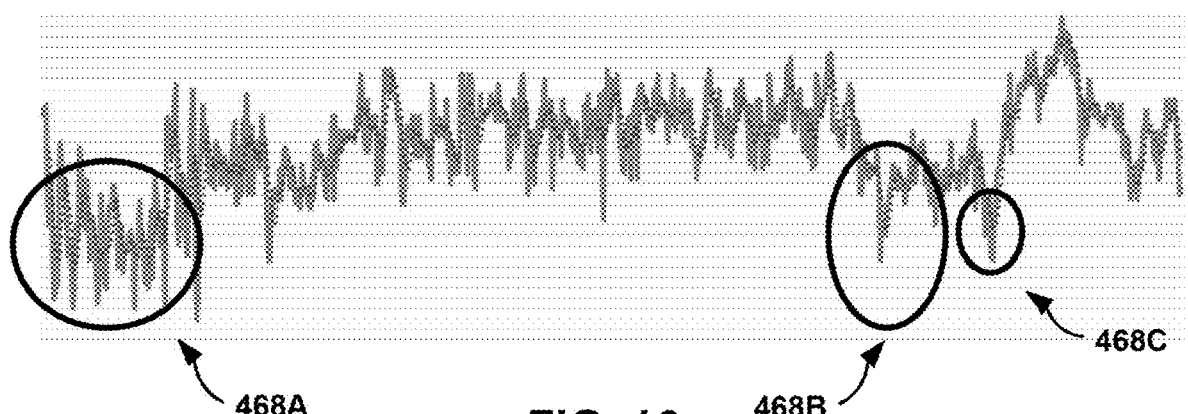
FIG. 16 is a graph of the power level of surveillance signals received from the vehicle of FIG. 15.

FIG. 16 is a graph of the power level of surveillance signals received from the vehicle 462 of FIG. 15. During crosswind turn 468A and base turn 468B, the power level of surveillance signals received from vehicle 462 may decrease because the antenna on the bottom of vehicle 462 may be oriented away from the receiving system. Although the final turn does not result in a decreased power level for received surveillance signals, there is a brief decrease in the power level at time 468C, possibly due to a brief maneuver in preparation of the final turn. Another maneuver prediction system may incorrectly predict the course and location of vehicle 462 during crosswind turn 468A and base turn 468B. A system of this disclosure may predict crosswind turn 468A and base turn 468B more accurately than predicted path 466 by using the power level of the surveillance signals to predict maneuvers.

Figure 17:
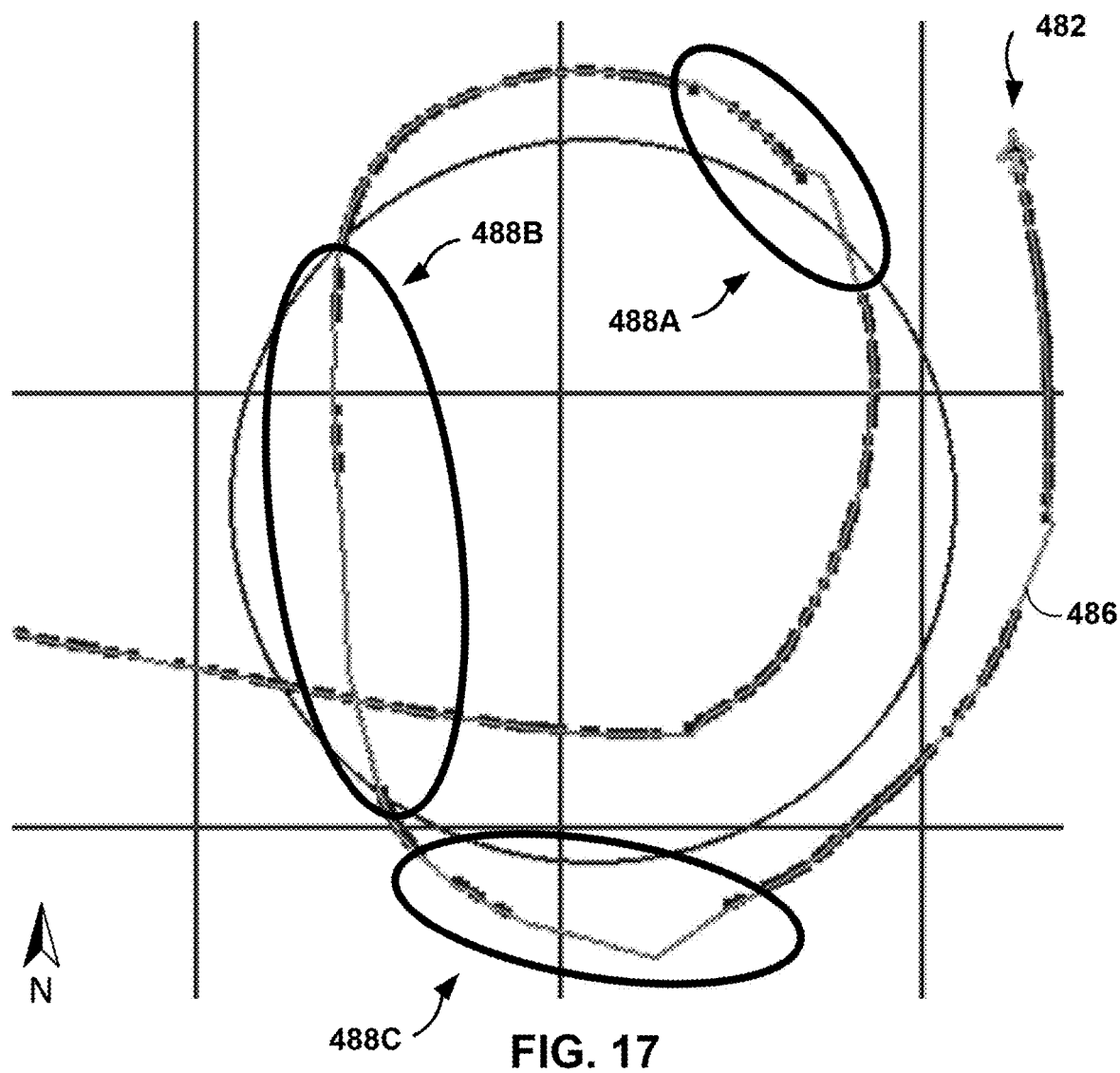
FIG. 17 shows a top view diagram of a predicted path and actual locations of a vehicle preparing to land at a runway.

FIG. 17 shows a top view diagram of a predicted path 486 and actual locations of a vehicle preparing to land at a runway. In some examples, the system receiving surveillance signals from vehicle 482 may be located to the northwest and at a higher altitude than vehicle 482. Vehicle 482 may be a helicopter circling around a landmark.

FIGS. 18A-18B are graphs of the power level of surveillance signals received from the vehicle 482 of FIG. 17, wherein some of the surveillance signals are partially impeded by terrain. During turns 488A-488C, the power level of surveillance signals received from vehicle 482 may decrease because the antenna onboard vehicle 482 may be oriented away from the receiving system. During turn 488C, the transmission of surveillance signals from vehicle 482 to the receiving system may be partially impeded by terrain such as mountains. Another maneuver prediction system may incorrectly predict the course and location of vehicle 482 during turns 488A-488C. A system of this disclosure may predict turns 488A-488C more accurately than predicted path 486 by using the power level of the surveillance signals and the location of hilly or mountainous terrain to predict maneuvers. When predicting maneuvers based on hilly or mountainous terrain, the processing circuitry may base the prediction on the altitudes of vehicle 482 and the receiving system.

Figure 19:
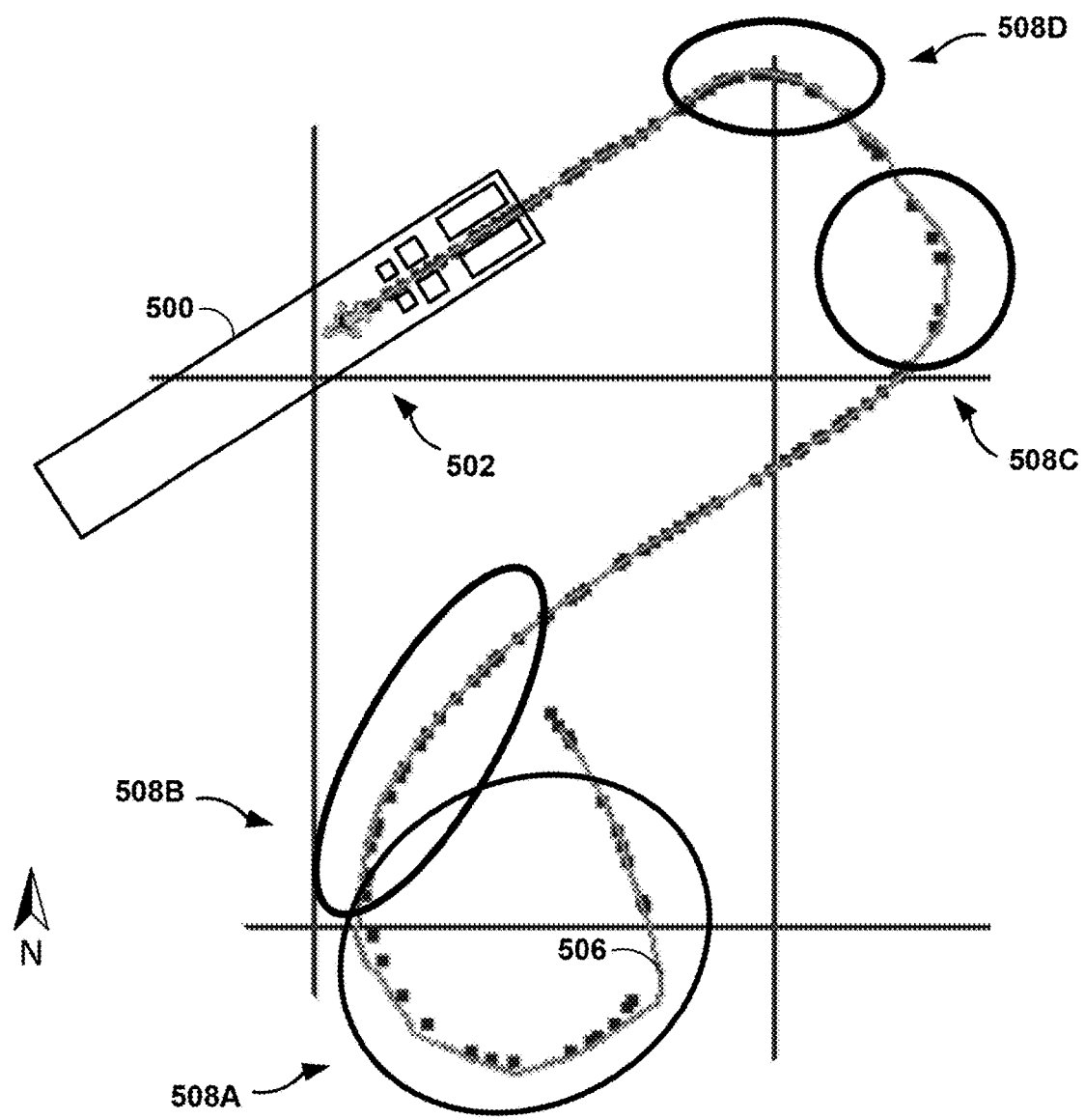
FIG. 19 shows a top view diagram of a predicted path and actual locations of a vehicle performing a tear-drop entry into rectangular traffic pattern.

FIG. 19 shows a top view diagram of a predicted path 506 and actual locations of a vehicle 502 performing a tear-drop entry into rectangular traffic pattern. In some examples, the system receiving surveillance signals from vehicle 502 may be located to the northwest and at a higher altitude than vehicle 502.

Figure 20:
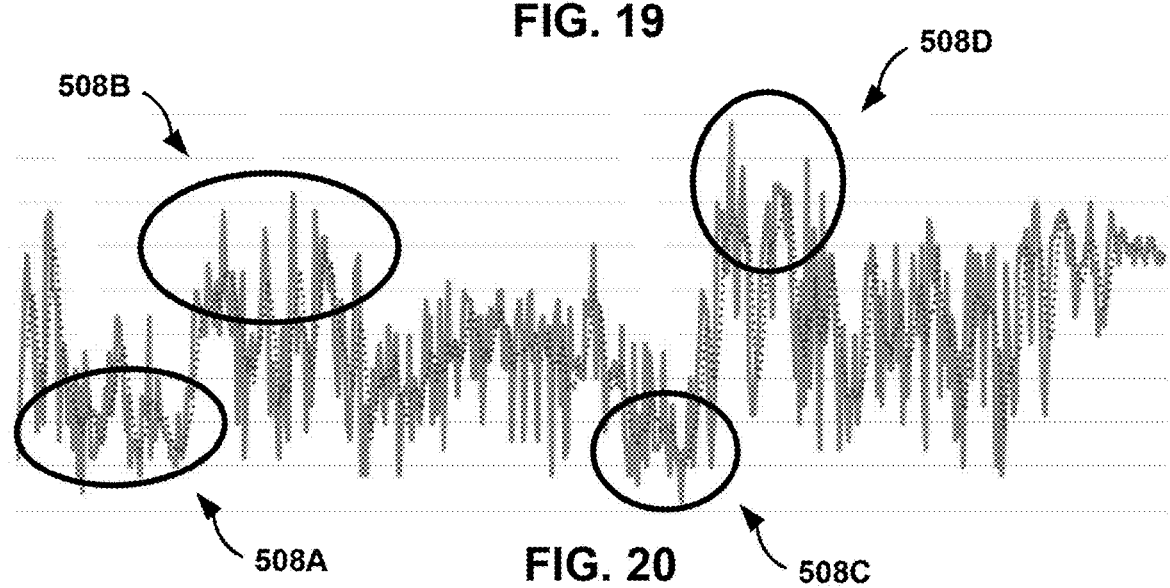
FIG. 20 is a graph of the power level of surveillance signals received from the vehicle of FIG. 19.

FIG. 20 is a graph of the power level of surveillance signals received from the vehicle 502 of FIG. 19. During tear-drop turn 508A and base turn 508C, the power level of surveillance signals received from vehicle 502 may decrease because vehicle 502 may be banking toward the receiving system. The antenna on the bottom of vehicle 502 may be oriented away from the receiving system. During tear-drop turn 508B and base turn 508D, the power level of surveillance signals received from vehicle 502 may increase because vehicle 502 may be banking away from the receiving system. The antenna on the bottom of vehicle 502 may be oriented towards the receiving system.

Figure 21:
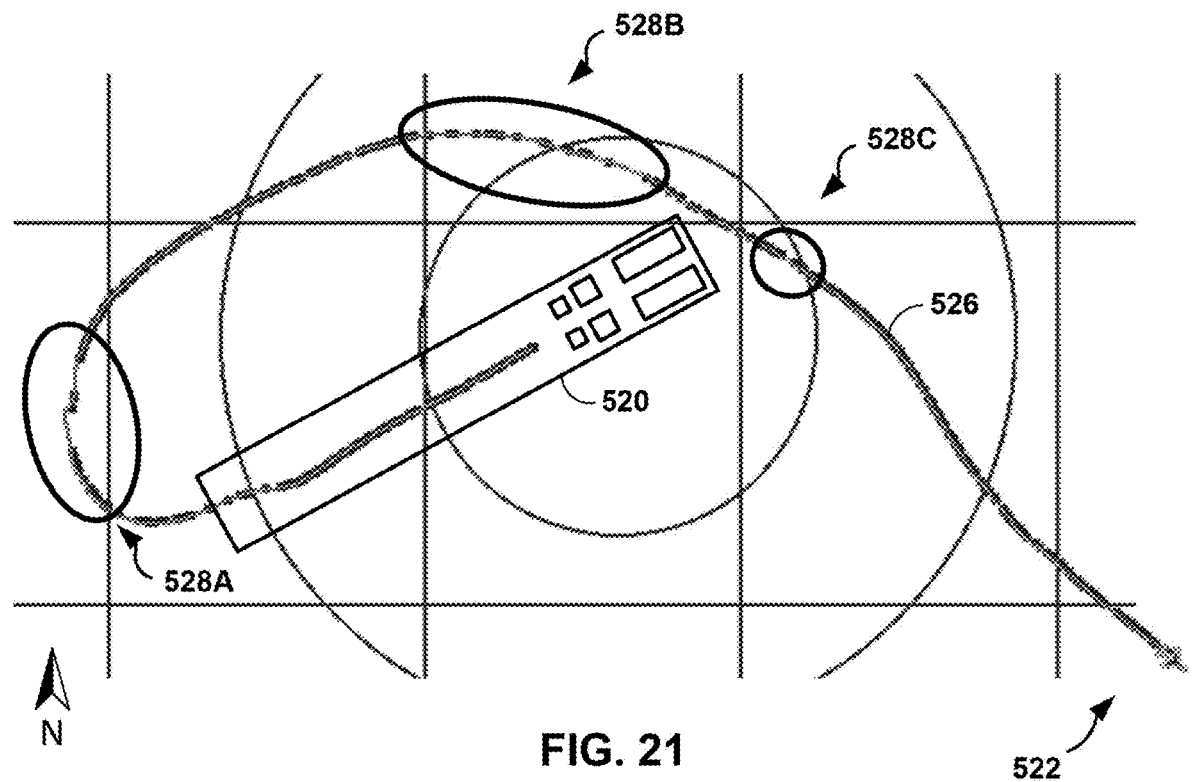
FIG. 21 shows a top view diagram of a predicted path and actual locations of a vehicle taking off from a runway.

FIG. 21 shows a top view diagram of a predicted path 526 and actual locations of a vehicle 522 taking off from a runway 520. In some examples, the system receiving surveillance signals from vehicle 522 may be located to the east-southeast and at a higher altitude than vehicle 522.

Figure 22:
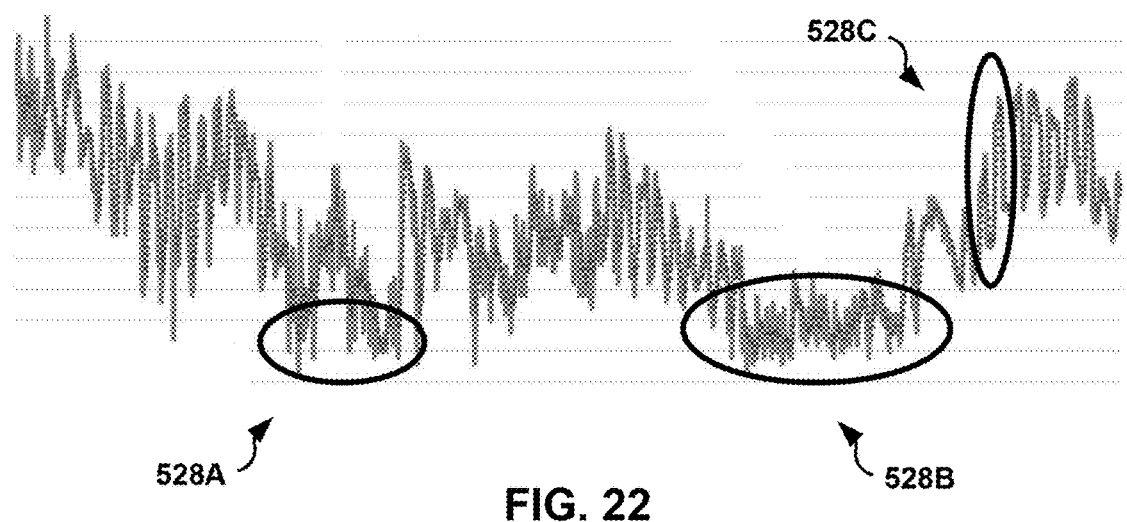
FIG. 22 is a graph of the power level of surveillance signals received from the vehicle of FIG. 21.

FIG. 22 is a graph of the power level of surveillance signals received from the vehicle 522 of FIG. 21. During crosswind turn 528A and departure turn 528B, the power level of surveillance signals received from vehicle 522 may decrease because the antenna on the bottom of vehicle 522 may be oriented away from the receiving system. The maneuver at time 528C may be predicted by a maneuver prediction system before the system receives the surveillance signals from vehicle 522.

The following examples may illustrate one or more of the techniques of this disclosure.

Example 1

A system for tracking a vehicle includes a transceiver configured to receive a first signal including first surveillance data from the vehicle at a first time, and receive a second signal from the vehicle at a second time. The system further includes processing circuitry configured to determine a first location of the vehicle at the first time based on the first surveillance data, determine a first course of the vehicle at the first time based on the first surveillance data, and determine a change in power level from the first signal to the second signal. The processing circuitry is further configured to predict a maneuver for the vehicle based at least in part on the first location, the first course, and the change in power level from the first signal to the second signal.

Example 2

The system of example 1, wherein the processing circuitry is configured to predict the maneuver by at least identifying one or more candidate maneuvers based on the first location and the first course; and choosing the maneuver from the one or more candidate maneuvers based on the change in power level from the first signal to the second signal.

Example 3

The system of example 2, wherein choosing the maneuver from the one or more candidate maneuvers comprises identifying expected signal characteristics for each candidate maneuver of the one or more candidate maneuvers; and choosing the maneuver based on determining that the characteristics of the second signal match the expected signal characteristics for the maneuver.

Example 4

The system of example 3, wherein identifying expected signal characteristics for each candidate maneuver of the one or more candidate maneuvers comprises predicting a power level for each candidate maneuver of the one or more candidate maneuvers; and choosing the maneuver is further based on determining that a difference between a power level of the second signal and the predicted power level for the maneuver is less than a threshold value.

Example 5

The system of examples 2-4 or any combination thereof, wherein identifying one or more candidate maneuvers comprises determining a location of the vehicle relative to a runway at the first time based on the first surveillance data; and determining a course of the vehicle relative to the runway at the first time based on the first surveillance data, wherein the processing circuitry is configured to predict the maneuver for the vehicle based on the location of the vehicle relative to a runway and the course of the vehicle relative to a runway.

Example 6

The system of examples 1-5 or any combination thereof, wherein the system is located on an ownship vehicle, and wherein the processing circuitry is further configured to determine if the ownship vehicle is blocking the second signal; and predicting the maneuver is further based on determining that the ownship vehicle is not blocking the second signal.

Example 7

The system of examples 1-6 or any combination thereof, wherein the processing circuitry is configured to predict that the maneuver is a turn towards the transceiver when a power level of the second signal is lower than a power level of the first signal.

Example 8

The system of examples 1-7 or any combination thereof, wherein the processing circuitry is configured to predict that the maneuver is a turn away from the transceiver when a power level of the second signal is higher than a power level of the first signal.

Example 9

The system of examples 1-8 or any combination thereof, wherein the processing circuitry is further configured to identify a second location of the vehicle at the second time based on the maneuver, identify a second course of the vehicle at the second time based on the maneuver, and output information indicating the second location and the second course to a display device.

Example 10

The system of examples 1-9 or any combination thereof, wherein the processing circuitry is further configured to generate an alert based on the maneuver.

Example 11

A method for tracking a vehicle includes receiving a first signal including first surveillance data from the vehicle at a first time, determining a first location of the vehicle at the first time based on the first surveillance data, and determining a first course of the vehicle at the first time based on the first surveillance data. The method further includes receiving a second signal from the vehicle at a second time, determining a change in power level from the first signal to the second signal, and predicting a maneuver for the vehicle based on the first location, the first course, and the change in power level from the first signal to the second signal.

Example 12

The method of example 11, wherein predicting the maneuver comprises identifying one or more candidate maneuvers based on the first location and the first course; identifying expected signal characteristics for each candidate maneuver of the one or more candidate maneuvers; and choosing the maneuver based on determining that the characteristics of the second signal match the expected signal characteristics for the maneuver.

Example 13

The method of example 12, wherein identifying expected signal characteristics for each candidate maneuver of the one or more candidate maneuvers comprises predicting a power level for each candidate maneuver of the one or more candidate maneuvers; and choosing the maneuver is further based on determining that a power level of the second signal matches the predicted power level for the maneuver.

Example 14

The method of example 12 or 13, wherein predicting one or more maneuvers comprises determining a location of the vehicle relative to a runway at the first time based on the first surveillance data; and determining a course of the vehicle relative to the runway at the first time based on the first surveillance data, wherein predicting the maneuver for the vehicle based on the location of the vehicle relative to a runway and the course of the vehicle relative to a runway.

Example 15

The method of examples 11-14 or any combination thereof, wherein predicting the maneuver for the vehicle comprises predicting a turn towards the transceiver when a power level of the second signal is lower than a power level of the first signal; and predicting a turn away the transceiver when the power level of the second signal is lower than the power level of the first signal.

Example 16

The method of examples 11-15 or any combination thereof, further comprising determining if the ownship vehicle is blocking the second signal, wherein predicting the maneuver is based on determining that the ownship vehicle is not blocking the second signal.

Example 17

A system located on a first vehicle for tracking a second vehicle, wherein the system includes a transceiver configured to receive a first signal including first surveillance data from the second vehicle at a first time, and receive a second signal from the second vehicle at a second time. The system further includes processing circuitry configured to determine if the first vehicle is blocking the second signal and identify, based on determining that the first vehicle is not blocking the second signal, one or more candidate maneuvers for the second vehicle. The processing circuitry is also configured to identify expected signal characteristics for each candidate maneuver of the one or more candidate maneuvers, determine if characteristics of the second signal match the expected signal characteristics for a candidate maneuver of the one or more candidate maneuvers, and predict a location of the second vehicle and a course of the second vehicle based on determining that the characteristics of the second signal match the expected signal characteristics for an candidate maneuver of the one or more candidate maneuvers.

Example 18

The system of example 17, wherein the processing circuitry is configured to identify expected signal characteristics for each candidate maneuver of the one or more candidate maneuvers by at least predicting that a power level of the second signal will be lower than a power level of the first signal for a turn towards the transceiver; and predicting that the power level of the second signal will be higher than the power level of the first signal for a turn away the transceiver.

Example 19

The system of examples 17-18 or any combination thereof, wherein the processing circuitry is configured to identify one or more candidate maneuvers by at least predicting one or more candidate maneuvers based on the first location and the first course; the processing circuitry is configured to identify expected signal characteristics for each candidate maneuver of the one or more candidate maneuvers by at least predicting a power level for each candidate maneuver of the one or more candidate maneuvers; and the processing circuitry is configured to determine if characteristics of the second signal match the expected signal characteristics for an candidate maneuver of the one or more candidate maneuvers by at least determining if a power level of the second signal matches the predicted power level for an candidate maneuver of the one or more candidate maneuvers.

Example 20

The system of examples 17-19 or any combination thereof, wherein the processing circuitry is further configured to determine a location of the second vehicle relative to a runway at the first time based on the first surveillance data; and determine a course of the second vehicle relative to the runway at the first time based on the first surveillance data, wherein the processing circuitry is configured to identify one or more candidate maneuvers for the second vehicle based on the location of the second vehicle relative to a runway and the course of the second vehicle relative to a runway.

Example 21

The system of examples 1-10 or any combination thereof, wherein the processing circuitry is further configured to determine that a third signal was not received by the transceiver based on a duration of time since receiving the second signal. The processing circuitry is further configured to predict a maneuver for the vehicle based on determining that the third signal was not received.

The techniques of this disclosure may be implemented in a device or article of manufacture including a computer-readable storage medium. The term "processing circuitry," as used herein may refer to any of the foregoing structure or any other structure suitable for processing program code and/or data or otherwise implementing the techniques described herein. Elements of processing circuitry may be implemented in any of a variety of types of solid state circuit elements, such as CPUs, CPU cores, GPUs, digital signal processors (DSPs), application-specific integrated circuits (ASICs), a mixed-signal integrated circuits, field programmable gate arrays (FPGAs), microcontrollers, programmable logic controllers (PLCs), programmable logic device (PLDs), complex PLDs (CPLDs), a system on a chip (SoC), any subsection of any of the above, an interconnected or distributed combination of any of the above, or any other integrated or discrete logic circuitry, or any other type of component or one or more components capable of being configured in accordance with any of the examples disclosed herein.

Vehicle traffic data system 100 of FIG. 3 may include one or more memory devices that include any volatile or non-volatile media, such as a RAM, ROM, non-volatile RAM (NVRAM), electrically erasable programmable ROM (EEPROM), flash memory, and the like. The one or more memory devices may store computer readable instructions that, when executed by processing circuitry, cause the processing circuitry to implement the techniques attributed herein to processing circuitry.

Elements of the processing circuitry and/or the transceiver may be programmed with various forms of software. The processing circuitry and/or the transceiver may be implemented at least in part as, or include, one or more executable applications, application modules, libraries, classes, methods, objects, routines, subroutines, firmware, and/or embedded code, for example. Elements of the processing circuitry and/or the transceiver as in any of the examples herein may be implemented as a device, a system, an apparatus, and may embody or implement a method of receiving surveillance signals and predicting future vehicle maneuvers.

The techniques of this disclosure may be implemented in a wide variety of computing devices. Any components, modules or units have been described to emphasize functional aspects and does not necessarily require realization by different hardware units. The techniques described herein may be implemented in hardware, software, firmware, or any combination thereof. Any features described as modules, units or components may be implemented together in an integrated logic device or separately as discrete but interoperable logic devices. In some cases, various features may be implemented as an integrated circuit device, such as an integrated circuit chip or chipset.

A "vehicle" may be an aircraft, a land vehicle such as an automobile, or a water vehicle such as a ship or a submarine. An "aircraft" as described and claimed herein may include any fixed-wing or rotary-wing aircraft, airship (e.g., dirigible or blimp buoyed by helium or other lighter-than-air gas), suborbital spaceplane, spacecraft, expendable or reusable launch vehicle or launch vehicle stage, or other type of flying device. An "aircraft" as described and claimed herein may include any crewed or uncrewed craft (e.g., uncrewed aerial vehicle (UAV), flying robot, or automated cargo or parcel delivery drone or other craft).

Various illustrative aspects of the disclosure are described above. These and other aspects are within the scope of the following claims.

What is claimed is:

1. A system for tracking a vehicle, the system comprising:
   a transceiver configured to:
      receive a first signal including first surveillance data from the vehicle at a first time; and
      receive a second signal from the vehicle at a second time; and
   processing circuitry configured to:
      determine a first location of the vehicle at the first time based on the first surveillance data;
      determine a first course of the vehicle at the first time based on the first surveillance data;
      determine a change in power level from the first signal to the second signal;
      predict a maneuver for the vehicle based on the first location, the first course;
   and the change in power level from the first signal to the second signal; and
      predict that the maneuver is a turn towards the transceiver when a power level of the second signal is lower than a power level of the first signal.

2. The system of claim 1, wherein the processing circuitry is configured to predict the maneuver by at least:
   identifying one or more candidate maneuvers based on the first location and the first course; and
   choosing the maneuver from the one or more candidate maneuvers based on the change in power level from the first signal to the second signal.

3. The system of claim 2, wherein the processing circuitry is configured to choose the maneuver from the one or more candidate maneuvers by at least:
   identifying expected signal characteristics for each candidate maneuver of the one or more candidate maneuvers; and
   choosing the maneuver based on determining that the characteristics of the second signal match the expected signal characteristics for the maneuver.

4. The system of claim 3, wherein:
   identifying expected signal characteristics for each candidate maneuver of the one or more candidate maneuvers comprises predicting a power level for each candidate maneuver of the one or more candidate maneuvers; and
   choosing the maneuver is further based on determining that a difference between the power level of the second signal and the predicted power level for the maneuver is less than a threshold value.

5. The system of claim 2, wherein identifying one or more candidate maneuvers comprises:
   determining a location of the vehicle relative to a runway at the first time based on the first surveillance data; and
   determining a course of the vehicle relative to the runway at the first time based on the first surveillance data,
   wherein the processing circuitry is configured to predict the maneuver for the vehicle based on the location of the vehicle relative to a runway and the course of the vehicle relative to a runway.

6. The system of claim 1, wherein the system is located on an ownship vehicle, and wherein:
   the processing circuitry is further configured to determine if the ownship vehicle is blocking the second signal; and
   predicting the maneuver is further based on determining that the ownship vehicle is not blocking the second signal.

7. The system of claim 1, wherein the processing circuitry is further configured to:
   determine that a third signal was not received by the transceiver based on a duration of time since receiving the second signal; and
   predict a maneuver for the vehicle based on determining that the third signal was not received.

8. The system of claim 1, wherein the processing circuitry is configured to predict that the maneuver is a turn away from the transceiver when the power level of the second signal is higher than the power level of the first signal.

9. The system of claim 1, wherein the processing circuitry is further configured to:
   identify a second location of the vehicle at the second time based on the maneuver;
   identify a second course of the vehicle at the second time based on the maneuver; and
   output information indicating the second location and the second course to a display device.

10. The system of claim 1, wherein the processing circuitry is further configured to generate an alert based on the maneuver.

11. A method for tracking a vehicle, the method comprising:
   receiving a first signal including first surveillance data from the vehicle at a first time;
   determining a first location of the vehicle at the first time based on the first surveillance data;
   determining a first course of the vehicle at the first time based on the first surveillance data;
   receiving a second signal from the vehicle at a second time;
   determining a change in power level from the first signal to the second signal; and predicting a maneuver for the vehicle based on the first location, the first course, and the change in power level from the first signal to the second signal,
wherein predicting the maneuver for the vehicle comprises:
predicting a turn towards the transceiver when a power level of the second signal is lower than a power level of the first signal; and
predicting a turn away the transceiver when the power level of the second signal is lower than the power level of the first signal.

12. The method of claim 11, wherein predicting the maneuver comprises:
identifying one or more candidate maneuvers based on the first location and the first course;
identifying expected signal characteristics for each candidate maneuver of the one or more candidate maneuvers; and
choosing the maneuver based on determining that the characteristics of the second signal match the expected signal characteristics for the maneuver.

13. The method of claim 12, wherein:
identifying expected signal characteristics for each candidate maneuver of the one or more candidate maneuvers comprises predicting a power level for each candidate maneuver of the one or more candidate maneuvers; and
choosing the maneuver is further based on determining that the power level of the second signal matches the predicted power level for the maneuver.

14. The method of claim 11, further comprising determining if the ownship vehicle is blocking the second signal, wherein predicting the maneuver is based on determining that the ownship vehicle is not blocking the second signal.

15. A system located on a first vehicle for tracking a second vehicle, the system comprising:
a transceiver configured to:
receive a first signal including first surveillance data from the second vehicle at a first time; and
receive a second signal from the second vehicle at a second time; and
processing circuitry configured to:
determine if the first vehicle is blocking the second signal;
identify, based on determining that the first vehicle is not blocking the second signal, one or more candidate maneuvers for the second vehicle;
identify expected signal characteristics for each candidate maneuver of the one or more candidate maneuvers by at least:
predicting that a power level of the second signal will be lower than a power level of the first signal for a turn towards the transceiver; and
predicting that the power level of the second signal will be higher than the power level of the first signal for a turn away the transceiver;
determine if characteristics of the second signal match the expected signal characteristics for a candidate maneuver of the one or more candidate maneuvers; and
predict a location of the second vehicle and a course of the second vehicle based on determining that the characteristics of the second signal match the expected signal characteristics for a candidate maneuver of the one or more candidate maneuvers.

16. The system of claim 15, wherein:
the processing circuitry is configured to identify one or more candidate maneuvers by at least predicting one or more candidate maneuvers based on the first location and the first course;
the processing circuitry is configured to identify expected signal characteristics for each candidate maneuver of the one or more candidate maneuvers by at least predicting a power level for each candidate maneuver of the one or more candidate maneuvers; and
the processing circuitry is configured to determine if characteristics of the second signal match the expected signal characteristics for a candidate maneuver of the one or more candidate maneuvers by at least determining if the power level of the second signal matches the predicted power level for a candidate maneuver of the one or more candidate maneuvers.

17. The system of claim 15, wherein the processing circuitry is further configured to:
determine a location of the second vehicle relative to a runway at the first time based on the first surveillance data; and
determine a course of the second vehicle relative to the runway at the first time based on the first surveillance data,
wherein the processing circuitry is configured to identify one or more candidate maneuvers for the second vehicle based on the location of the second vehicle relative to a runway and the course of the second vehicle relative to a runway.

18. A system for tracking a vehicle comprising:
a transceiver configured to:
receive a first signal including first surveillance data from the vehicle at a first time; and
receive a second signal from the vehicle at a second time; and
processing circuitry configured to:
determine a first location of the vehicle at the first time based on the first surveillance data;
determine a first course of the vehicle at the first time based on the first surveillance data;
determine a change in power level from the first signal to the second signal;
predict a maneuver for the vehicle based on the first location, the first course, and the change in power level from the first signal to the second signal;
determine that a third signal was not received by the transceiver based on a duration of time since receiving the second signal; and
predict a maneuver for the vehicle based on determining that the third signal was not received.

19. A system for tracking a vehicle comprising:
a transceiver configured to:
receive a first signal including first surveillance data from the vehicle at a first time; and
receive a second signal from the vehicle at a second time; and
processing circuitry configured to:
determine a first location of the vehicle at the first time based on the first surveillance data;
determine a first course of the vehicle at the first time based on the first surveillance data;
determine a change in power level from the first signal to the second signal;
predict a maneuver for the vehicle based on the first location, the first course, and the change in power level from the first signal to the second signal; and predict that the maneuver is a turn away from the transceiver when a power level of the second signal is higher than a power level of the first signal.

20. The system of claim 19, wherein the processing circuitry is further configured to:

determine that a third signal was not received by the transceiver based on a duration of time since receiving the second signal; and predict a maneuver for the vehicle based on determining that the third signal was not received.

* * * * *